US012637346B2

(12) United States Patent
    Crawford et al.

(10) Patent No.: US 12,637,346 B2
(45) Date of Patent: May 26, 2026

(54) UNATTENDED BEVERAGE DISPENSING SYSTEMS AND METHODS

(71) Applicant: PepsiCo, Inc., Purchase, NY (US)

(72) Inventors: Robert Crawford, Yorktown Heights, NY (US); Sam Karol, Hawthorne, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 17/560,822

(22) Filed: Dec. 23, 2021

(65) Prior Publication Data

US 2022/0112070 A1    Apr. 14, 2022

Related U.S. Application Data

(63) Continuation of application No. 15/943,395, filed on Apr. 2, 2018, now Pat. No. 11,208,315.

(51) Int. Cl.
    *B67D 1/08* (2006.01)
    *B67D 1/00* (2006.01)
    (Continued)

(52) U.S. Cl.
    CPC ......... *B67D 1/0888* (2013.01); *B67D 1/0005* (2013.01); *G06Q 20/40145* (2013.01); *B67D 1/0881* (2013.01); *H04L 63/0861* (2013.01)

(58) Field of Classification Search
    CPC .. B67D 1/0888; B67D 1/0881; G67D 1/0005; G06Q 20/40145; H04L 63/0861
    (Continued)

(56) References Cited

U.S. PATENT DOCUMENTS 3,270,918 A * 9/1966 Goodrich .............. A47J 31/007
                                                    222/64
5,165,575 A    11/1992 Scott
              (Continued)

FOREIGN PATENT DOCUMENTS

AU      2014201133 A1 * 3/2014 ............. G06Q 20/20
CN      101438297 A     5/2009
              (Continued)

OTHER PUBLICATIONS

Notification of Transmittal of the International Search Report and the Written Opinion of the International Searching Authority, or the Declaration issued in International Application PCT/US2019/024300, mailed Jun. 11, 2019, 12 pages.
              (Continued)

*Primary Examiner* — Rakesh Kumar
(74) *Attorney, Agent, or Firm* — Sterne, Kessler, Goldstein & Fox P.L.L.C.

(57)                ABSTRACT

Unattended beverage dispensers configured to dispense one or more beverages after authenticating a customer and associating the customer with a customer account. An unattended beverage dispenser may include a user interface with a biometric sensor configured to identify a biometric characteristic of a customer. A controller associated with the unattended beverage dispenser may authenticate a customer based on a biometric characteristic and associate the authenticated customer with a customer account. After authenticating a customer, the controller may allow beverage dispensing from the unattended beverage dispenser in accordance with a beverage dispensing rule associated with the customer's account.

20 Claims, 7 Drawing Sheets

(51) Int. Cl.
    *G06Q 20/40*       (2012.01)
    *H04L 9/40*        (2022.01)

(58) Field of Classification Search
    USPC ........................................................ 700/237
    See application file for complete search history.

(56) References Cited

U.S. PATENT DOCUMENTS

| | | | |
|---|---|---|---|
| 5,181,631 A | | 1/1993 | Credle, Jr. et al. |
| 5,318,197 A | * | 6/1994 | Martindale .......... B67D 3/0003 |
| | | | 222/30 |
| 5,566,732 A | | 10/1996 | Nelson |
| 6,230,767 B1 | | 5/2001 | Nelson |
| 6,234,222 B1 | | 5/2001 | Nelson |
| 6,237,652 B1 | | 5/2001 | Nelson |
| 6,345,729 B1 | | 2/2002 | Santy, Jr. et al. |
| 6,424,884 B1 | | 7/2002 | Brooke, Jr. et al. |
| 6,564,999 B1 | | 5/2003 | Saveliev et al. |
| 6,572,016 B2 | | 6/2003 | Saveliev et al. |
| 6,584,309 B1 | | 6/2003 | Whigham |
| 6,600,969 B2 | | 7/2003 | Sudolcan et al. |
| 6,616,037 B2 | | 9/2003 | Grimm et al. |
| 6,684,920 B2 | | 2/2004 | Seitz et al. |
| 6,759,072 B1 | | 7/2004 | Gutwein et al. |
| 6,764,003 B1 | | 7/2004 | Martschitsch et al. |
| 6,850,816 B2 | | 2/2005 | Garratt |
| 6,935,532 B2 | | 8/2005 | Tinucci et al. |
| 6,945,157 B2 | | 9/2005 | Brown et al. |
| 7,004,355 B1 | | 2/2006 | Crisp, III et al. |
| 7,031,804 B2 | | 4/2006 | Brooke, Jr. et al. |
| 7,032,818 B2 | | 4/2006 | Thomas et al. |
| 7,110,954 B2 | | 9/2006 | Yung et al. |
| 7,197,377 B2 | | 3/2007 | Knepler |
| 7,223,427 B2 | | 5/2007 | Knepler |
| 7,257,547 B1 | | 8/2007 | Terase |
| 7,265,673 B2 | | 9/2007 | Teller |
| 7,320,414 B2 | | 1/2008 | Davis |
| 7,331,483 B2 | | 2/2008 | Bhimani et al. |
| 7,353,850 B2 | | 4/2008 | Greiwe et al. |
| 7,387,239 B2 | | 6/2008 | Thomas et al. |
| 7,439,859 B2 | | 10/2008 | Humphrey |
| 7,445,133 B2 | | 11/2008 | Ludovissie et al. |
| 7,455,867 B1 | | 11/2008 | Gutwein et al. |
| 7,458,510 B1 | | 12/2008 | Zhou |
| 7,464,835 B2 | | 12/2008 | Coronado et al. |
| 7,574,377 B2 | | 8/2009 | Carpelli |
| 7,593,867 B2 | | 9/2009 | Deakin et al. |
| 7,611,052 B2 | | 11/2009 | Gosi et al. |
| 7,617,850 B1 | | 11/2009 | Dorney |
| 7,624,895 B2 | | 12/2009 | Haskayne |
| 7,627,496 B2 | | 12/2009 | Walker et al. |
| 7,637,205 B2 | | 12/2009 | Greiwe et al. |
| 7,651,008 B2 | | 1/2010 | Sher et al. |
| 7,654,191 B2 | | 2/2010 | Greenwald et al. |
| 7,757,896 B2 | | 7/2010 | Carpenter et al. |
| 7,762,181 B2 | | 7/2010 | Boland et al. |
| 7,779,099 B2 | | 8/2010 | Raghunathan et al. |
| 7,806,294 B2 | | 10/2010 | Gatipon et al. |
| 7,813,834 B2 | | 10/2010 | Sudolcan et al. |
| 7,845,375 B2 | | 12/2010 | Dorney |
| 7,881,822 B2 | | 2/2011 | Thornton et al. |
| 7,889,182 B2 | | 2/2011 | Romanyszyn et al. |
| 7,890,209 B2 | | 2/2011 | Knepler |
| 7,899,713 B2 | | 3/2011 | Rothschild |
| 7,900,799 B2 | | 3/2011 | Kuzar et al. |
| 7,913,878 B1 | | 3/2011 | Baron et al. |
| 7,918,156 B2 | | 4/2011 | Greenwald et al. |
| 7,972,639 B2 | | 7/2011 | Guerrero et al. |
| 7,997,448 B1 | | 8/2011 | Leyva |
| 8,015,088 B2 | | 9/2011 | Phillips et al. |
| 8,032,420 B2 | | 10/2011 | Dziaba et al. |
| 8,062,684 B2 | | 11/2011 | Gutwein et al. |
| 8,091,735 B2 | | 1/2012 | Girard et al. |
| 8,121,917 B2 | | 2/2012 | Insolia et al. |
| 8,127,805 B2 | | 3/2012 | Dorney |
| 8,130,083 B2 | | 3/2012 | Dorney |
| 8,151,832 B1 | | 4/2012 | Dorney |
| 8,155,784 B2 | | 4/2012 | Lowe et al. |
| 8,162,176 B2 | | 4/2012 | Rudick |
| 8,162,210 B2 | | 4/2012 | McInerney et al. |
| 8,176,948 B2 | | 5/2012 | Carrig |
| 8,181,822 B2 | | 5/2012 | Doelman et al. |
| 8,245,739 B1 | | 8/2012 | Wade et al. |
| 8,250,972 B2 | | 8/2012 | Santoiemmo et al. |
| 8,251,258 B2 | | 8/2012 | Rudick et al. |
| 8,332,272 B2 | | 12/2012 | Fisher |
| 8,333,301 B2 | | 12/2012 | Majer |
| 8,335,592 B2 | | 12/2012 | Deo et al. |
| 8,340,815 B2 | | 12/2012 | Peters et al. |
| 8,352,323 B2 | | 1/2013 | Fisher |
| 8,408,255 B1 | | 4/2013 | Wade et al. |
| 8,413,884 B2 | | 4/2013 | Lim et al. |
| 8,417,377 B2 | | 4/2013 | Rothschild |
| 8,434,319 B2 | | 5/2013 | Klier et al. |
| 8,434,642 B2 | | 5/2013 | Rudick |
| 8,442,674 B2 | | 5/2013 | Tilton et al. |
| 8,459,043 B2 | | 6/2013 | Bertone |
| 8,473,864 B2 | | 6/2013 | Segal et al. |
| 8,490,829 B2 | | 7/2013 | Deo et al. |
| 8,511,348 B2 | | 8/2013 | Lillard, Jr. |
| 8,515,574 B2 | | 8/2013 | Studor et al. |
| 8,520,897 B2 | | 8/2013 | Boncyk et al. |
| 8,523,065 B1 | | 9/2013 | Wade et al. |
| 8,561,830 B2 | | 10/2013 | Hallberg |
| 8,565,916 B2 | | 10/2013 | Zhang et al. |
| 8,584,900 B2 | | 11/2013 | Metropulos et al. |
| 8,600,899 B1 | | 12/2013 | Davis |
| 8,610,536 B2 | | 12/2013 | Libby et al. |
| 8,610,684 B2 | | 12/2013 | Kalu et al. |
| 8,635,164 B2 | | 1/2014 | Rosenhaft et al. |
| 8,688,277 B2 | | 4/2014 | Studor et al. |
| 8,718,818 B2 | | 5/2014 | Nordbryhn |
| 8,739,840 B2 | | 6/2014 | Mattos, Jr. et al. |
| 8,744,618 B2 | | 6/2014 | Peters et al. |
| 8,744,939 B2 | | 6/2014 | Phillips et al. |
| 8,751,037 B2 | | 6/2014 | Peters et al. |
| 8,755,932 B2 | | 6/2014 | Peters et al. |
| 8,763,918 B2 | | 7/2014 | Lillard, Jr. |
| 8,768,505 B2 | | 7/2014 | Thompson |
| 8,774,963 B2 | | 7/2014 | Signorelli et al. |
| 8,776,838 B1 | | 7/2014 | Dorney |
| 8,781,622 B2 | | 7/2014 | Mockus et al. |
| 8,788,090 B2 | | 7/2014 | Rothschild |
| 8,788,359 B2 | | 7/2014 | Stache et al. |
| 8,798,799 B2 | | 8/2014 | Deo et al. |
| 8,800,867 B2 | | 8/2014 | Majer |
| 8,805,594 B2 | | 8/2014 | Shah et al. |
| 8,814,000 B2 | | 8/2014 | Rudick |
| 8,825,538 B2 | | 9/2014 | Insolia et al. |
| 8,833,241 B2 | | 9/2014 | Santoiemmo |
| 8,839,343 B2 | | 9/2014 | Wang |
| 8,851,329 B2 | | 10/2014 | Rudick et al. |
| 8,863,649 B1 | | 10/2014 | Rao et al. |
| 8,880,427 B1 | | 11/2014 | Jones |
| 8,899,280 B2 | | 12/2014 | Deo et al. |
| 8,902,818 B2 | | 12/2014 | Chu et al. |
| 8,903,737 B2 | | 12/2014 | Cameron et al. |
| 8,910,674 B2 | | 12/2014 | Segiet et al. |
| 8,942,628 B2 | | 1/2015 | Haverinen |
| 8,945,374 B2 | | 2/2015 | Chase |
| 8,959,028 B2 | | 2/2015 | Canter et al. |
| 8,960,075 B2 | | 2/2015 | Traitler et al. |
| 8,960,500 B2 | | 2/2015 | Petrus et al. |
| 8,972,048 B2 | | 3/2015 | Canora et al. |
| 8,996,178 B2 | | 3/2015 | Studor et al. |
| 9,014,846 B2 | | 4/2015 | Newman |
| 9,020,635 B2 | | 4/2015 | Hortin |
| 9,023,245 B2 | | 5/2015 | Chakravarti et al. |
| 9,026,245 B2 | | 5/2015 | Tilton et al. |
| 9,045,323 B2 | | 6/2015 | Crane et al. |
| 9,051,162 B2 | | 6/2015 | Peters et al. |
| 9,054,818 B2 | | 6/2015 | Wang |
| 9,061,879 B2 | | 6/2015 | Patthey |
| 9,071,926 B2 | | 6/2015 | Krishnan et al. |

(56)               References Cited

U.S. PATENT DOCUMENTS

| | | | |
|---|---|---|---|
| 9,092,768 | B2 | 7/2015 | Breitenbach et al. |
| 9,102,508 | B2 | 8/2015 | O'Keefe, Jr. et al. |
| 9,107,449 | B2 | 8/2015 | Njaastad et al. |
| 9,111,271 | B2 | 8/2015 | Dennis |
| 9,111,303 | B2 | 8/2015 | Nicol et al. |
| 9,111,312 | B2 | 8/2015 | Jones |
| 9,113,749 | B2 | 8/2015 | Castellani et al. |
| 9,135,613 | B2 | 9/2015 | Dennis |
| 9,149,152 | B2 | 10/2015 | Cahen et al. |
| 9,169,112 | B2 | 10/2015 | Chase et al. |
| 9,199,833 | B2 | 12/2015 | Scarvelli |
| 9,212,040 | B2 | 12/2015 | Segiet et al. |
| 9,218,704 | B2 | 12/2015 | Lim et al. |
| 9,245,402 | B2 | 1/2016 | Green et al. |
| 9,245,403 | B2 | 1/2016 | Geigel et al. |
| 9,246,611 | B2 | 1/2016 | Wang |
| 9,265,375 | B2 | 2/2016 | Knepler |
| 9,271,141 | B1 | 2/2016 | Egeler et al. |
| 9,297,577 | B2 | 3/2016 | Anselmino et al. |
| 9,305,296 | B1 | 4/2016 | Burger |
| 9,334,149 | B2 | 5/2016 | Dorney |
| 9,334,150 | B1 | 5/2016 | Ost et al. |
| 9,346,659 | B2 | 5/2016 | Brown |
| 9,349,238 | B2 | 5/2016 | Tkachenko et al. |
| 9,365,406 | B2 | 6/2016 | Hortin |
| 9,373,091 | B1 | 6/2016 | Belser et al. |
| 9,434,596 | B2 | 9/2016 | Carpenter et al. |
| 9,445,259 | B2 | 9/2016 | Sheth et al. |
| 9,454,868 | B2 | 9/2016 | Hirshbain |
| 9,457,928 | B2 | 10/2016 | Evers et al. |
| 9,472,043 | B2 | 10/2016 | Mockus et al. |
| 9,473,478 | B2 | 10/2016 | Subramanian et al. |
| 9,475,683 | B2 | 10/2016 | Givens et al. |
| 9,495,616 | B2 | 11/2016 | Carbonini |
| 9,495,673 | B2 | 11/2016 | Cameron et al. |
| 9,499,385 | B1 | 11/2016 | Studor |
| 9,499,387 | B2 | 11/2016 | Nicol et al. |
| 9,511,988 | B2 | 12/2016 | Hernandez et al. |
| 9,521,922 | B2 | 12/2016 | Deo et al. |
| 9,527,715 | B2 | 12/2016 | Boggs et al. |
| 9,533,783 | B2 | 1/2017 | Talarico |
| 9,533,867 | B2 | 1/2017 | Hortin |
| 9,536,236 | B2 | 1/2017 | Hay |
| 9,595,058 | B2 | 3/2017 | Khalid |
| 9,600,850 | B2 | 3/2017 | Holman et al. |
| 9,624,460 | B2 | 4/2017 | Wunder |
| 9,646,314 | B2 | 5/2017 | Moore et al. |
| 9,647,777 | B2 | 5/2017 | Wang |
| 9,666,013 | B2 | 5/2017 | Want et al. |
| 9,679,329 | B2 | 6/2017 | Jones |
| 9,701,530 | B2 | 7/2017 | Kline et al. |
| 9,721,060 | B2 | 8/2017 | Chung et al. |
| 9,751,744 | B2 | 9/2017 | Grottini |
| 9,751,745 | B2 | 9/2017 | Grottini |
| 9,764,935 | B2 | 9/2017 | Jersey et al. |
| 9,783,403 | B2 | 10/2017 | Tansey, Jr. |
| 9,803,914 | B2 | 10/2017 | Anselmino et al. |
| 9,809,437 | B2 | 11/2017 | Tansey, Jr. |
| 9,870,670 | B2 | 1/2018 | Yau |
| 9,898,884 | B1 | 2/2018 | Arora et al. |
| 9,911,267 | B2 | 3/2018 | Signorelli et al. |
| 9,926,186 | B2 | 3/2018 | Nicol et al. |
| 9,932,216 | B2 | 4/2018 | Hernandez et al. |
| 9,934,657 | B2 | 4/2018 | Tkachenko et al. |
| 9,942,796 | B2 * | 4/2018 | Raleigh ................. H04W 28/24 |
| 9,959,530 | B2 | 5/2018 | Geigel et al. |
| 9,975,752 | B2 | 5/2018 | Keating et al. |
| 10,009,351 | B2 | 6/2018 | Choi |
| 10,019,864 | B2 | 7/2018 | Tomkins et al. |
| 10,031,505 | B2 | 7/2018 | Martindale et al. |
| 10,046,959 | B2 | 8/2018 | Rudick |
| 10,057,709 | B2 | 8/2018 | Wegelin et al. |
| 10,074,083 | B2 | 9/2018 | Westby et al. |
| 10,083,430 | B2 | 9/2018 | Hay |
| 10,101,080 | B2 | 10/2018 | Willis et al. |
| 10,109,143 | B2 | 10/2018 | Signorelli et al. |
| 10,158,721 | B2 | 12/2018 | Jarnagin, III |
| 10,227,226 | B2 | 3/2019 | Jersey et al. |
| 10,252,149 | B2 | 4/2019 | Huang et al. |
| 10,255,746 | B2 | 4/2019 | Peters et al. |
| 10,315,907 | B2 | 6/2019 | Segiet et al. |
| 10,328,769 | B2 | 6/2019 | Ferguson et al. |
| 10,377,623 | B2 | 8/2019 | Arcand |
| 10,380,822 | B2 | 8/2019 | Signorelli et al. |
| 10,384,925 | B2 | 8/2019 | Cuppari et al. |
| 10,410,272 | B1 * | 9/2019 | Johnson ............... G06Q 20/202 |
| 10,417,624 | B2 | 9/2019 | Salvucci et al. |
| 10,433,670 | B2 | 10/2019 | Flick |
| 10,438,184 | B2 | 10/2019 | Barragan Trevino et al. |
| 10,445,754 | B2 | 10/2019 | Snider et al. |
| 10,460,547 | B2 | 10/2019 | Yau |
| 10,482,443 | B2 | 11/2019 | Suelberg |
| 10,489,763 | B2 | 11/2019 | Kamat |
| 10,489,868 | B2 | 11/2019 | Long, II |
| 10,497,200 | B2 | 12/2019 | Gaur et al. |
| 10,504,171 | B2 | 12/2019 | Khalid |
| 10,540,702 | B2 | 1/2020 | Conforti |
| 10,542,838 | B2 * | 1/2020 | Rithener ................ G05B 15/02 |
| 10,544,028 | B2 | 1/2020 | Guy et al. |
| 10,554,929 | B2 | 2/2020 | Stephens et al. |
| 10,558,330 | B2 | 2/2020 | Suh et al. |
| 10,562,757 | B2 | 2/2020 | Biasi et al. |
| 10,595,669 | B2 | 3/2020 | Noth |
| 10,602,334 | B2 | 3/2020 | Kim |
| 10,628,789 | B2 | 4/2020 | Hewet et al. |
| 10,687,654 | B2 | 6/2020 | Buchholz et al. |
| 10,721,625 | B2 | 7/2020 | Mars et al. |
| 10,740,583 | B2 | 8/2020 | Noth |
| 10,755,315 | B2 | 8/2020 | Cuppari et al. |
| 10,759,644 | B2 | 9/2020 | Lim et al. |
| 10,762,487 | B2 | 9/2020 | Apodaca Salinas et al. |
| 10,769,625 | B2 | 9/2020 | Pandiarajan et al. |
| 10,789,633 | B2 | 9/2020 | Zises et al. |
| 10,796,518 | B2 | 10/2020 | Dubey |
| 10,810,565 | B2 | 10/2020 | Davis |
| 10,810,689 | B2 | 10/2020 | Insolia et al. |
| 10,820,746 | B2 | 11/2020 | Noth |
| 10,853,832 | B2 | 12/2020 | Wittek |
| 10,854,033 | B2 * | 12/2020 | Jafa .................... G06Q 30/0641 |
| 10,861,276 | B1 | 12/2020 | Arora et al. |
| 10,874,238 | B2 | 12/2020 | Nieraad et al. |
| 10,891,614 | B2 | 1/2021 | Patel |
| 10,899,595 | B2 | 1/2021 | Cuppari |
| 10,902,400 | B2 | 1/2021 | Abu Hamam |
| 10,919,752 | B2 | 2/2021 | Breault |
| 10,932,610 | B2 | 3/2021 | Nachawati |
| 10,986,167 | B2 | 4/2021 | Raboin |
| 10,991,184 | B2 | 4/2021 | Jee et al. |
| 11,043,060 | B1 | 6/2021 | Murphy |
| 11,084,704 | B2 | 8/2021 | Sawhney et al. |
| 11,087,376 | B2 | 8/2021 | Cuppari et al. |
| 11,087,579 | B2 | 8/2021 | Yau |
| 11,538,264 | B2 * | 12/2022 | Bathory-Frota ....... H04N 23/55 |
| 2003/0071806 | A1 | 4/2003 | Annand |
| 2003/0200008 | A1 * | 10/2003 | Wilson ................... G07C 5/008 |
| | | | 700/236 |
| 2004/0088224 | A1 * | 5/2004 | Mukai ............... G06Q 10/0637 |
| | | | 705/7.36 |
| 2004/0167664 | A1 | 8/2004 | Griffin |
| 2005/0029287 | A1 | 2/2005 | Mobbs |
| 2005/0034606 | A1 | 2/2005 | In Albon |
| 2005/0087255 | A1 | 4/2005 | Humphrey et al. |
| 2005/0211768 | A1 | 9/2005 | Stillman |
| 2006/0027599 | A1 | 2/2006 | Edwards et al. |
| 2006/0118581 | A1 | 6/2006 | Clark |
| 2006/0190128 | A1 | 8/2006 | Brooke, Jr. et al. |
| 2006/0190345 | A1 | 8/2006 | Crowley |
| 2007/0026916 | A1 | 2/2007 | Juds et al. |
| 2007/0036348 | A1 | 2/2007 | Orr |
| 2007/0145074 | A1 | 6/2007 | Sevcik |
| 2007/0212468 | A1 | 9/2007 | White et al. |
| 2007/0235533 | A1 | 10/2007 | Giordano |
| 2007/0239549 | A1 | 10/2007 | Lafauci et al. |
| 2007/0261566 | A1 | 11/2007 | Varney et al. |

(56)  References Cited

U.S. PATENT DOCUMENTS

| | | | |
|---|---|---|---|
| 2008/0066483 A1 | 3/2008 | Klier et al. | |
| 2008/0083780 A1 | 4/2008 | Romanyszyn et al. | |
| 2008/0087720 A1* | 4/2008 | Levitov | G06Q 20/4014 |
| | | | 235/382 |
| 2008/0126261 A1 | 5/2008 | Lovett | |
| 2008/0153567 A1 | 6/2008 | Juds et al. | |
| 2008/0189078 A1 | 8/2008 | Vok et al. | |
| 2008/0195251 A1 | 8/2008 | Milner | |
| 2008/0195252 A1 | 8/2008 | Innocenti et al. | |
| 2008/0235766 A1 | 9/2008 | Wallos et al. | |
| 2008/0257948 A1* | 10/2008 | Jochim | G07F 13/025 |
| | | | 235/375 |
| 2009/0040050 A1 | 2/2009 | Humphrey | |
| 2009/0065570 A1* | 3/2009 | Peters | B67D 1/0888 |
| | | | 705/413 |
| 2009/0069931 A1* | 3/2009 | Peters | B67D 1/0888 |
| | | | 700/236 |
| 2009/0152345 A1 | 6/2009 | Johnson | |
| 2009/0157515 A1 | 6/2009 | Lafauci et al. | |
| 2009/0167492 A1* | 7/2009 | Madafferi | G07C 9/37 |
| | | | 340/5.82 |
| 2009/0177318 A1 | 7/2009 | Sizemore | |
| 2009/0222339 A1 | 9/2009 | Antao et al. | |
| 2010/0125362 A1 | 5/2010 | Canora et al. | |
| 2010/0187298 A1 | 7/2010 | Phillips et al. | |
| 2010/0198643 A1 | 8/2010 | Friedman et al. | |
| 2011/0123688 A1 | 5/2011 | Deo et al. | |
| 2011/0168775 A1 | 7/2011 | Van Zetten | |
| 2011/0172814 A1 | 7/2011 | Breitenbach et al. | |
| 2011/0184812 A1 | 7/2011 | Stoulil | |
| 2011/0278191 A1 | 11/2011 | Lillard, Jr. | |
| 2011/0298583 A1* | 12/2011 | Libby | B67D 1/0888 |
| | | | 340/5.2 |
| 2012/0018452 A1 | 1/2012 | Anliker et al. | |
| 2012/0047007 A1 | 2/2012 | Halsey et al. | |
| 2012/0103926 A1 | 5/2012 | Ibsies | |
| 2012/0136479 A1 | 5/2012 | Signorelli et al. | |
| 2012/0139735 A1 | 6/2012 | Dollner et al. | |
| 2012/0156337 A1 | 6/2012 | Studor et al. | |
| 2012/0166117 A1 | 6/2012 | Warburton et al. | |
| 2012/0245732 A1 | 9/2012 | Yoakim | |
| 2013/0043304 A1 | 2/2013 | Agon et al. | |
| 2013/0079926 A1 | 3/2013 | Peters et al. | |
| 2013/0085600 A1 | 4/2013 | Nicol et al. | |
| 2013/0087050 A1 | 4/2013 | Studor et al. | |
| 2013/0092567 A1 | 4/2013 | Lok | |
| 2013/0096715 A1 | 4/2013 | Chung et al. | |
| 2013/0140324 A1 | 6/2013 | Deo et al. | |
| 2013/0284029 A1 | 10/2013 | Reed et al. | |
| 2013/0311284 A1 | 11/2013 | Quinn | |
| 2013/0340453 A1 | 12/2013 | Chan | |
| 2013/0341395 A1 | 12/2013 | Chan | |
| 2014/0040055 A1 | 2/2014 | Quartarone et al. | |
| 2014/0053944 A1 | 2/2014 | Wang | |
| 2014/0053950 A1 | 2/2014 | Vandersteen | |
| 2014/0059133 A1 | 2/2014 | Wang | |
| 2014/0081777 A1 | 3/2014 | Mastrodonato et al. | |
| 2014/0110476 A1 | 4/2014 | Sheehan et al. | |
| 2014/0114469 A1 | 4/2014 | Givens et al. | |
| 2014/0134299 A1 | 5/2014 | Guidorzi et al. | |
| 2014/0142749 A1 | 5/2014 | Peters et al. | |
| 2014/0196811 A1 | 7/2014 | Ramos, III et al. | |
| 2014/0255883 A1 | 9/2014 | Macquet | |
| 2014/0263447 A1 | 9/2014 | Peters, Jr. et al. | |
| 2014/0290181 A1 | 10/2014 | Edwards et al. | |
| 2014/0297026 A1 | 10/2014 | Peters, Jr. et al. | |
| 2014/0309770 A1 | 10/2014 | Signorelli et al. | |
| 2014/0337159 A1 | 11/2014 | Rothschild | |
| 2014/0337795 A1 | 11/2014 | Deo et al. | |
| 2014/0361035 A1 | 12/2014 | Rudick | |
| 2014/0379123 A1 | 12/2014 | Hirshbain | |
| 2015/0039776 A1* | 2/2015 | Jarnagin, III | H04W 4/70 |
| | | | 709/228 |
| 2015/0046877 A1 | 2/2015 | Cuppari et al. | |
| 2015/0053302 A1 | 2/2015 | Willis et al. | |
| 2015/0082243 A1 | 3/2015 | Taylor et al. | |
| 2015/0110931 A1 | 4/2015 | Chase | |
| 2015/0144652 A1* | 5/2015 | Kline | B67D 1/0888 |
| | | | 222/23 |
| 2015/0164264 A1 | 6/2015 | Studor et al. | |
| 2015/0187160 A1 | 7/2015 | Anning | |
| 2015/0191341 A1 | 7/2015 | Martindale et al. | |
| 2015/0217985 A1 | 8/2015 | Raley | |
| 2015/0225223 A1 | 8/2015 | Morales Lema | |
| 2015/0225224 A1 | 8/2015 | Tilton et al. | |
| 2015/0230653 A1 | 8/2015 | Cheng | |
| 2015/0251891 A1 | 9/2015 | Peters et al. | |
| 2015/0305548 A1 | 10/2015 | Girault et al. | |
| 2015/0317860 A1 | 11/2015 | Hubner et al. | |
| 2015/0325075 A1 | 11/2015 | Jones | |
| 2015/0353338 A1 | 12/2015 | Nicol et al. | |
| 2015/0375984 A1 | 12/2015 | Arcand | |
| 2016/0058245 A1 | 3/2016 | Smith et al. | |
| 2016/0090288 A1* | 3/2016 | Givens, Jr. | G07F 13/065 |
| | | | 700/283 |
| 2016/0092851 A1 | 3/2016 | De Berg Hewett | |
| 2016/0096715 A1 | 4/2016 | Segiet et al. | |
| 2016/0098883 A1 | 4/2016 | Green et al. | |
| 2016/0171811 A1 | 6/2016 | Khamphilapanyo et al. | |
| 2016/0189461 A1 | 6/2016 | Kanon et al. | |
| 2016/0209106 A1 | 7/2016 | Anselmino et al. | |
| 2016/0239904 A1 | 8/2016 | Washington et al. | |
| 2016/0245852 A1 | 8/2016 | Warburton et al. | |
| 2016/0264395 A1 | 9/2016 | Hortin | |
| 2016/0284153 A1 | 9/2016 | Tansey, Jr. et al. | |
| 2016/0314640 A1 | 10/2016 | Ward et al. | |
| 2016/0351001 A1 | 12/2016 | Hirshbain | |
| 2016/0363921 A1 | 12/2016 | Martindale et al. | |
| 2016/0368752 A1 | 12/2016 | Bethuy et al. | |
| 2016/0368753 A1 | 12/2016 | Bethuy et al. | |
| 2017/0008750 A1* | 1/2017 | Hernandez | G06F 3/04817 |
| 2017/0088410 A1 | 3/2017 | Wing et al. | |
| 2017/0099981 A1 | 4/2017 | Haidar et al. | |
| 2017/0121165 A1 | 5/2017 | Gabrieli | |
| 2017/0172340 A1 | 6/2017 | Baarman et al. | |
| 2017/0186110 A1 | 6/2017 | Carpenter et al. | |
| 2017/0224151 A1* | 8/2017 | Rithener | A47J 31/3642 |
| 2017/0275147 A1 | 9/2017 | Moezedis | |
| 2017/0293983 A1 | 10/2017 | Long | |
| 2017/0300936 A1 | 10/2017 | Wilkinson et al. | |
| 2017/0301173 A1 | 10/2017 | Hindsgaul et al. | |
| 2017/0330164 A1 | 11/2017 | Suelberg | |
| 2017/0345245 A1 | 11/2017 | Torresani et al. | |
| 2018/0029859 A1 | 2/2018 | Hevia et al. | |
| 2018/0044158 A1 | 2/2018 | Jersey et al. | |
| 2018/0086621 A1 | 3/2018 | Dubief et al. | |
| 2018/0099850 A1 | 4/2018 | Lyons et al. | |
| 2018/0137461 A1 | 5/2018 | Wilkinson et al. | |
| 2018/0186621 A1 | 7/2018 | Jangbarwala et al. | |
| 2018/0211235 A1 | 7/2018 | Geigel et al. | |
| 2018/0251361 A1 | 9/2018 | Wing et al. | |
| 2018/0265344 A1 | 9/2018 | Keating et al. | |
| 2018/0288594 A1 | 10/2018 | Kim | |
| 2018/0300702 A1 | 10/2018 | Li et al. | |
| 2018/0308079 A1 | 10/2018 | Zong et al. | |
| 2018/0327243 A1 | 11/2018 | Rider et al. | |
| 2018/0362321 A1 | 12/2018 | Lim et al. | |
| 2018/0365668 A1 | 12/2018 | Hay | |
| 2018/0365924 A1 | 12/2018 | Yoakim et al. | |
| 2019/0012498 A1 | 1/2019 | Mahncke | |
| 2019/0019210 A1 | 1/2019 | Yamazaki et al. | |
| 2019/0025108 A1 | 1/2019 | Jones | |
| 2019/0034901 A1 | 1/2019 | Gaur et al. | |
| 2019/0071298 A1 | 3/2019 | Tomforde et al. | |
| 2019/0073648 A1 | 3/2019 | Salvucci et al. | |
| 2019/0108709 A1 | 4/2019 | Yamazaki et al. | |
| 2019/0135607 A1 | 5/2019 | Petermann | |
| 2019/0164237 A1* | 5/2019 | Newman | G06Q 50/12 |
| 2019/0172297 A1 | 6/2019 | Schwarber et al. | |
| 2019/0174933 A1 | 6/2019 | Auda et al. | |
| 2019/0180262 A1 | 6/2019 | Huang et al. | |
| 2019/0188667 A1 | 6/2019 | Wolfson | |
| 2019/0202680 A1 | 7/2019 | Rider et al. | |

(56) References Cited

U.S. PATENT DOCUMENTS

| | | | |
|---|---|---|---|
| 2019/0205858 A1 | 7/2019 | Tang et al. | |
| 2019/0251522 A1 | 8/2019 | Wallis | |
| 2019/0287089 A1 | 9/2019 | Mahncke | |
| 2019/0295354 A1 | 9/2019 | Chon et al. | |
| 2019/0300357 A1 * | 10/2019 | Crawford | G07F 13/065 |
| 2020/0031656 A1 * | 1/2020 | Rudick | G06F 3/0486 |
| 2020/0034808 A1 | 1/2020 | Kamat | |
| 2020/0098218 A1 | 3/2020 | Hartmann et al. | |
| 2020/0134960 A1 | 4/2020 | Kingston et al. | |
| 2020/0196793 A1 | 6/2020 | Ninomiya et al. | |
| 2020/0198958 A1 | 6/2020 | Kline et al. | |
| 2020/0226628 A1 | 7/2020 | Snider et al. | |
| 2020/0236175 A1 | 7/2020 | Wang | |
| 2020/0242584 A1 | 7/2020 | Campbell et al. | |
| 2020/0388099 A1 | 12/2020 | Ji et al. | |
| 2021/0039942 A1 | 2/2021 | Springer | |
| 2021/0081939 A1 | 3/2021 | Kuenzi et al. | |
| 2021/0147209 A1 | 5/2021 | Cuppari | |

FOREIGN PATENT DOCUMENTS

| | | | | | |
|---|---|---|---|---|---|
| EP | 1281137 B1 | 9/2003 | | | |
| EP | 1245010 B1 | 8/2004 | | | |
| EP | 1466307 A1 | 10/2004 | | | |
| EP | 3242277 A1 | 8/2008 | | | |
| EP | 1697908 B1 | 3/2009 | | | |
| EP | 1810598 B1 | 12/2009 | | | |
| EP | 2504271 B1 | 11/2010 | | | |
| EP | 2085000 B1 | 12/2011 | | | |
| EP | 2396271 A2 | 12/2011 | | | |
| EP | 2702543 A1 | 3/2014 | | | |
| EP | 2504245 B1 | 5/2014 | | | |
| EP | 2839423 A2 | 2/2015 | | | |
| EP | 2506746 B1 | 4/2015 | | | |
| EP | 2252542 B1 | 9/2015 | | | |
| EP | 2969900 A1 | 1/2016 | | | |
| EP | 2997468 B1 | 3/2016 | | | |
| EP | 2764481 B1 | 5/2016 | | | |
| EP | 3028477 A1 | 6/2016 | | | |
| EP | 3033740 A1 | 6/2016 | | | |
| EP | 3053151 A1 | 8/2016 | | | |
| EP | 3055632 A1 | 8/2016 | | | |
| EP | 2504270 B1 | 11/2016 | | | |
| EP | 3092612 B1 | 11/2016 | | | |
| EP | 3049364 B1 | 12/2016 | | | |
| EP | 3116823 A1 | 1/2017 | | | |
| EP | 3122239 A1 | 2/2017 | | | |
| EP | 3127077 A1 | 2/2017 | | | |
| EP | 3185731 A1 | 7/2017 | | | |
| EP | 3198570 A1 | 8/2017 | | | |
| EP | 3238166 A1 | 11/2017 | | | |
| EP | 3252722 A1 | 12/2017 | | | |
| EP | 3252723 A1 | 12/2017 | | | |
| EP | 3252724 A1 | 12/2017 | | | |
| EP | 2969904 B1 | 1/2018 | | | |
| EP | 2976975 B1 | 1/2018 | | | |
| EP | 3078306 B1 | 1/2018 | | | |
| EP | 3281166 A1 | 2/2018 | | | |
| EP | 3284053 A1 | 2/2018 | | | |
| EP | 3287993 A1 | 2/2018 | | | |
| EP | 3291128 A1 | 3/2018 | | | |
| EP | 3300496 A1 | 4/2018 | | | |
| EP | 3324370 A1 | 5/2018 | | | |
| EP | 3357020 A1 | 8/2018 | | | |
| EP | 3357044 A1 | 8/2018 | | | |
| EP | 3360115 A1 | 8/2018 | | | |
| EP | 3364826 A1 | 8/2018 | | | |
| EP | 3445704 B1 | 8/2018 | | | |
| EP | 2782485 B1 | 10/2018 | | | |
| EP | 3394816 A1 | 10/2018 | | | |
| EP | 3405075 A1 | 11/2018 | | | |
| EP | 3407767 B1 | 12/2018 | | | |
| EP | 3418964 A1 | 12/2018 | | | |
| EP | 3421414 A1 | 1/2019 | | | |
| EP | 3433821 A1 | 1/2019 | | | |
| EP | 1405261 B2 | 2/2019 | | | |
| EP | 3442381 A1 | 2/2019 | | | |
| EP | 3275345 B1 | 3/2019 | | | |
| EP | 3452995 A1 | 3/2019 | | | |
| EP | 3493167 A1 | 6/2019 | | | |
| EP | 3497051 A1 | 6/2019 | | | |
| EP | 2999659 B1 | 7/2019 | | | |
| EP | 3526681 A1 | 8/2019 | | | |
| EP | 2504268 B1 | 9/2019 | | | |
| EP | 3090413 B1 | 11/2019 | | | |
| EP | 2563710 B1 | 12/2019 | | | |
| EP | 3614891 A1 | 3/2020 | | | |
| EP | 3637358 A1 | 4/2020 | | | |
| EP | 3278692 B1 | 8/2020 | | | |
| EP | 3182869 B1 | 10/2020 | | | |
| EP | 3723057 A1 | 10/2020 | | | |
| EP | 3321896 B1 | 11/2020 | | | |
| EP | 3762330 A1 | 1/2021 | | | |
| EP | 3774636 A1 | 2/2021 | | | |
| EP | 2912609 B1 | 6/2021 | | | |
| ES | 2768656 T3 | 6/2020 | | | |
| ES | 2881226 T3 | 11/2021 | | | |
| GB | 2429694 A | 3/2007 | | | |
| WO | WO 9732284 A1 | 9/1997 | | | |
| WO | WO 0052655 A1 | 9/2000 | | | |
| WO | WO 0112033 A2 | 2/2001 | | | |
| WO | WO 0112034 A2 | 2/2001 | | | |
| WO | WO 0112038 A2 | 2/2001 | | | |
| WO | WO-0112039 A2 * | 2/2001 | | | A47J 31/521 |
| WO | WO 0117893 A2 | 3/2001 | | | |
| WO | WO 0152621 A2 | 7/2001 | | | |
| WO | WO 0224569 A1 | 3/2002 | | | |
| WO | WO 03005295 A1 | 1/2003 | | | |
| WO | WO 2004024615 A1 | 3/2004 | | | |
| WO | WO 2004030435 A2 | 4/2004 | | | |
| WO | WO 2004096694 A1 | 11/2004 | | | |
| WO | WO 2004097690 A1 | 11/2004 | | | |
| WO | WO 2005003022 A1 | 1/2005 | | | |
| WO | WO 2005043469 A1 | 5/2005 | | | |
| WO | WO 2005111955 A1 | 11/2005 | | | |
| WO | WO 2006021039 A1 | 3/2006 | | | |
| WO | WO 2006066338 A1 | 6/2006 | | | |
| WO | WO 2006125279 A1 | 11/2006 | | | |
| WO | WO 2007015905 A2 | 2/2007 | | | |
| WO | WO-2007098529 A1 * | 9/2007 | | | G07C 9/37 |
| WO | WO 2009016610 A2 | 2/2009 | | | |
| WO | WO 2009032686 A1 | 3/2009 | | | |
| WO | WO 2009032929 A2 | 3/2009 | | | |
| WO | WO 2009032938 A2 | 3/2009 | | | |
| WO | WO 2009032941 A2 | 3/2009 | | | |
| WO | WO 2009032946 A1 | 3/2009 | | | |
| WO | WO 2009058095 A1 | 5/2009 | | | |
| WO | WO 2009111286 A1 | 9/2009 | | | |
| WO | WO 2009111289 A1 | 9/2009 | | | |
| WO | WO 2009111291 A1 | 9/2009 | | | |
| WO | WO 2009115774 A2 | 9/2009 | | | |
| WO | WO 2010010587 A1 | 1/2010 | | | |
| WO | WO 2010093747 A2 | 8/2010 | | | |
| WO | WO 2011066438 A1 | 6/2011 | | | |
| WO | WO 2011066444 A1 | 6/2011 | | | |
| WO | WO 2011066448 A1 | 6/2011 | | | |
| WO | WO 2011067156 A1 | 6/2011 | | | |
| WO | WO 2011067232 A1 | 6/2011 | | | |
| WO | WO 2011094625 A1 | 8/2011 | | | |
| WO | WO 2012032543 A1 | 3/2012 | | | |
| WO | WO 2012058449 A1 | 5/2012 | | | |
| WO | WO 2012083194 A2 | 6/2012 | | | |
| WO | WO 2012084573 A1 | 6/2012 | | | |
| WO | WO 2012129686 A1 | 10/2012 | | | |
| WO | WO 2012134296 A1 | 10/2012 | | | |
| WO | WO 2012145649 A1 | 10/2012 | | | |
| WO | WO 2012174609 A1 | 12/2012 | | | |
| WO | WO 2013011078 A1 | 1/2013 | | | |
| WO | WO 2013055938 A1 | 4/2013 | | | |
| WO | WO 2013114321 A1 | 8/2013 | | | |
| WO | WO 2013124188 A1 | 8/2013 | | | |
| WO | WO 2013158407 A1 | 10/2013 | | | |
| WO | WO 2013190253 A1 | 12/2013 | | | |
| WO | WO 2014076296 A1 | 5/2014 | | | |

(56)  References Cited

FOREIGN PATENT DOCUMENTS

| | | | |
|---|---|---|---|
| WO | WO 2014091284 A1 | 6/2014 | |
| WO | WO 2014096017 A1 | 6/2014 | |
| WO | WO 2014188389 A1 | 11/2014 | |
| WO | WO 2015017559 A1 | 2/2015 | |
| WO | WO 2015026767 A1 | 2/2015 | |
| WO | WO 2015044494 A1 | 4/2015 | |
| WO | WO 2015053837 A2 | 4/2015 | |
| WO | WO 2015103399 A1 | 7/2015 | |
| WO | WO 2015148710 A1 | 10/2015 | |
| WO | WO 2015153565 A1 | 10/2015 | |
| WO | WO-2016004235 A2 * | 1/2016 | ............ G06Q 20/20 |
| WO | WO 2016011214 A1 | 1/2016 | |
| WO | WO 2016048159 A1 | 3/2016 | |
| WO | WO 2016053994 A1 | 4/2016 | |
| WO | WO 2016073441 A1 | 5/2016 | |
| WO | WO 2016154269 A1 | 9/2016 | |
| WO | WO 2016162740 A1 | 10/2016 | |
| WO | WO 2016168120 A1 | 10/2016 | |
| WO | WO 2016191748 A1 | 12/2016 | |
| WO | WO 2017015576 A1 | 1/2017 | |
| WO | WO 2017062656 A1 | 4/2017 | |
| WO | WO 2017085018 A1 | 5/2017 | |
| WO | WO 2017112850 A1 | 6/2017 | |
| WO | WO 2017160193 A1 | 9/2017 | |
| WO | WO 2017192871 A1 | 11/2017 | |
| WO | WO 2017205033 A1 | 11/2017 | |
| WO | WO 2017211890 A1 | 12/2017 | |
| WO | WO2018035113 A1 | 2/2018 | |
| WO | WO 2018071685 A1 | 4/2018 | |
| WO | WO 2018125955 A1 | 7/2018 | |
| WO | WO2018226904 A1 | 12/2018 | |
| WO | WO2018231853 A1 | 12/2018 | |
| WO | WO2019067944 A1 | 4/2019 | |
| WO | WO 2019121927 A1 | 6/2019 | |
| WO | WO-2023147113 A1 * | 8/2023 | ......... G06Q 30/0633 |

OTHER PUBLICATIONS

Byford, Sam, "The world's first phone with an in-display fingerprint sensor is here | The Verge," Jan. 24, 2018 (Jan. 24, 2018), URL:https://www.theverge.com/circuitbreaker/2018/1 /24/16926930/vivo-x20-plus-ud-fingerprint-scanner-in-screen-announcement-specs.

* cited by examiner

Biometric Characteristic Profiles

| Customer Number | Biometric ID | Customer Account | | | |
|---|---|---|---|---|---|
| | | Beverage Rule | Beverage Restriction | Promotional Rule | Preferences |
| 041987 | Fingerprint | Volume Rule | N/A | One free re-fill | Wild Cherry |
| 071787 | Fingerprint | Re-fill Rule | Max. 20 oz./day | N/A | Diet Pepsi |
| 112993 | Retinal | Geographic | Natural sweetener only | N/A | Mountain Dew |
| 122970 | Voice | Geographic | Natural sweetener only | Free 20 oz. | Mountain Dew |
| 051393 | Face | Volume Rule | Artificial sweetener only | N/A | Pepsi |
| 021987 | Face | Re-fill Rule | N/A | N/A | Sierra Mist |

FIG. 2

UNATTENDED BEVERAGE DISPENSING SYSTEMS AND METHODS

CROSS-REFERENCE TO RELATED APPLICATION

This application is a continuation of and claims priority to U.S. application Ser. No. 15/943,395, filed on Apr. 2, 2018, which is incorporated herein by reference in its entirety.

FIELD

The described embodiments generally related to unattended beverage dispensing. In particular, embodiments relate to unattended beverage dispensing systems and methods that utilize biometric identification to beverages at an unattended beverage dispenser kiosk.

BACKGROUND

Beverage dispensers are used to dispense beverages to customers at various locations, such as restaurants, cafeterias, theatres and other entertainment and/or food service venues. In some locations, self-service beverage dispensers are employed to dispense beverages. For example, customers at an amusement park may purchase a beverage cup that allows them to fill the cup themselves using a self-service beverage dispenser. Self-service beverage dispensers may be desirable in many settings to enhance customer experience and reduce employee time needed to fill customer orders. Due to these and other benefits, self-service beverage dispensers are used in numerous venues including movie theaters, buffet or cafeteria-style restaurants, cruise ships, concert venues, and sports stadiums.

Some unattended beverage dispensers may allow unlimited beverage dispensing to persons that approach the beverage dispenser at a venue. Some unattended beverage dispensers may restrict the amount of beverage that may be dispensed by a customer who has purchased a beverage at a venue. Dispensing systems have been developed that allow the dispenser to identify a cup as being authorized for use with a self-service beverage dispenser. For example, a customer may purchase a cup with a barcode on the cup. Upon scanning of the barcode, a beverage dispenser may allow a customer to dispense beverage into the cup, if the barcode is authorized for dispensing. As another example, beverage dispensing control may be accomplished with a radio-frequency identification (RFID) tag on a cup. In some cases, the RFID tag may be a read-write RFID tag.

Control of the persons authorized to dispense beverage(s) and the amount of beverage(s) such authorized persons are allowed to dispense may help a venue owner and/or operator reduce losses due to theft or wasteful consumption by customers. Also, positive customer experience with a self-service beverage dispenser may be desirable to a venue owner and/or operator. Positive customer experience and customer satisfaction associated with the use of a beverage dispenser may be a desirable tool for a venue owner/operator to entice beverage sales and return customers. Moreover, positive customer experience and satisfaction may facilitate brand recognition and may be a valuable marketing tool.

Therefore, a continuing need exists for methods and systems for controlling access to self-service beverage dispensers.

BRIEF SUMMARY OF THE INVENTION

Some embodiments are directed to a beverage dispenser including a dispensing nozzle configured to dispense one or more beverages; a user interface having a biometric sensor configured to identify a biometric characteristic of a customer; and a controller configured to authenticate a customer based on the biometric characteristic, associate the authenticated customer with a customer account, the customer account including a beverage dispensing rule for the authenticated customer, and allow beverage dispensing from the dispensing nozzle after authenticating the customer and associating the authenticated customer with the customer account.

Some embodiments are directed to a beverage dispensing system including a database configured to store a plurality of authorized biometric characteristic profiles, each of the authorized profiles including a biometric characteristic and a customer account, where the customer account includes a beverage dispensing rule; a beverage dispenser including a dispensing nozzle configured to dispense one or more beverages and a user interface having a biometric sensor configured to identify a customer biometric characteristic; and a controller configured to authenticate a customer based on the customer biometric characteristic by comparing the customer biometric characteristic to the authorized biometric characteristic profiles, associate the authenticated customer with a particular one of the authorized biometric characteristic profiles in the database, and allow beverage dispensing from the dispensing nozzle based on the particular authorized biometric characteristic profile.

Some embodiments are directed to a method of dispensing a beverage from an unattended beverage dispenser, the method including storing a plurality of authorized biometric characteristic profiles in a database, each of the authorized profiles including a biometric characteristic and a customer account, where the customer account includes a beverage dispensing rule; authenticating a customer at the unattended beverage dispenser by collecting a customer biometric characteristic at the unattended beverage dispenser and comparing the customer biometric characteristic to the authorized biometric characteristic profiles in the database; associating the authenticated customer with a particular one of the authorized biometric characteristic profiles in the database; and dispensing beverage at the unattended beverage dispenser based on the particular authorized biometric characteristic profile.

In any of the various embodiments discussed herein, a user interface may include an electronic display screen and a biometric sensor may include a camera for optically identifying the biometric characteristic of the customer. In some embodiments, the electronic display screen is configured to display an image captured by the camera.

In any of the various embodiments discussed herein, a user interface may include an actuator configured to initiate dispensing of a beverage from the dispensing nozzle. In some embodiments, the actuator may include a biometric sensor. In some embodiments, upon actuation of the actuator, the controller may be configured to authenticate a customer, associate the authenticated customer with a customer account, and initiate dispensing of a beverage from a dispensing nozzle. In some embodiments, upon sensing that the actuator has been disengaged, a controller may be configured to record an amount of beverage dispensed from a dispensing nozzle and update a beverage dispensing rule based on the beverage dispensed. In some embodiments, an actuator may include a button. In some embodiments, an actuator may include a touch screen.

In any of the various embodiments discussed herein, a biometric sensor may include a fingerprint reader.

In any of the various embodiments discussed herein, a controller may be configured to compare an identified biometric characteristic against a database of authorized biometric characteristics.

In any of the various embodiments discussed herein, a customer account may include a purchased beverage plan.

In any of the various embodiments discussed herein, a customer account may include a promotional beverage allowance.

In any of the various embodiments discussed herein, a customer account may include customer preferences.

In any of the various embodiments discussed herein, a beverage dispensing rule may include at least one of: a beverage volume allowance rule, a beverage re-fill allowance rule, a time-based rule, a geographic location-based rule, and a prepaid credit rule.

In any of the various embodiments discussed herein, a customer account may include a beverage dispensing restriction. In some embodiments, the beverage dispensing restriction may include at least one of: a maximum volume allowance restriction, a re-fill allowance restriction, and a beverage type restriction.

In any of the various embodiments discussed herein, a controller may be configured to track beverage dispensed by an authenticated customer and update a beverage dispensing rule based on beverage dispensed by the authenticated customer.

In any of the various embodiments discussed herein, a biometric characteristic may include at least one of: a fingerprint, a finger vein pattern, a retinal profile, an iris profile, a face profile, and a voice profile.

In any of the various embodiments discussed herein, a controller may be configured to allow beverage dispensing from a dispensing nozzle for a predetermined amount of time. In some embodiments, once the predetermined amount of time expires, the controller may be configured to prevent beverage dispensing until a future customer is authenticated.

In any of the various embodiments discussed herein, authorized biometric characteristic profiles may be received at a database from a mobile device application.

In any of the various embodiments discussed herein, a beverage dispenser may be configured to collect authorized biometric characteristic profiles.

BRIEF DESCRIPTION OF THE DRAWINGS/FIGURES

FIG. 2 illustrates customer profiles according to some embodiments.

DETAILED DESCRIPTION OF THE INVENTION

Figure 1:
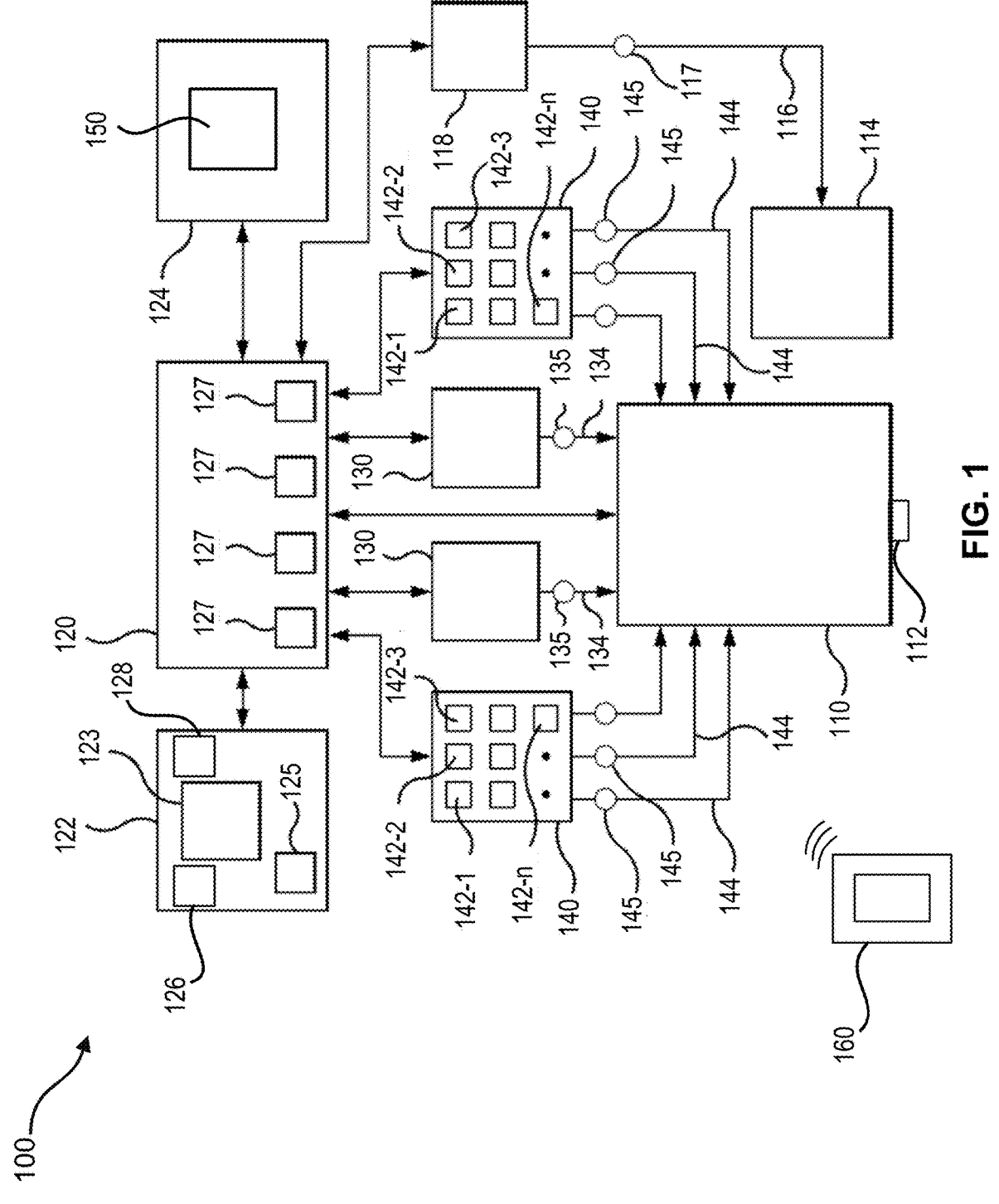
FIG. 1 illustrates a dispensing system according to some embodiments.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A customer may choose to purchase a beverage directly dispensed from a beverage dispenser into his or her cup (e.g., a fountain drink) for a variety of reasons. In contrast to purchasing a packaged (e.g., bottled or canned) beverage, purchasing a fountain drink may provide the customer with increased control over the amount of beverage(s) and type(s) of beverage he or she may receive. For example, purchasing a fountain drink allows a customer to choose from a variety of different beverage types, allows a customer to try various types of beverages, and allows a customer to re-fill his or her cup with a desired amount of the same beverage, or a different beverage. Moreover, purchasing a fountain drink may give a customer the freedom to customize his or her drink by mixing different beverage types (e.g., a customer may mix a regular cola with a diet cola).

In some instances, a dispenser may allow a customer to customize his or her beverage by pre-selecting a combination of beverages, flavors, additives, etc. that are dispensed into his or her cup. In such cases, the beverage dispenser may include a user interface that allows a customer to make desired selections. This flexibility and customization may entice beverage sales and attract customers to locations that provide dispensers with such capabilities. The customization of beverages may be enjoyable for customers and may positively contribute to the customers' experience and satisfaction at a particular venue (e.g., a restaurant, a cafeteria, a theatre, and other entertainment and/or food service venues). As such, these attributes of a dispenser may be desirable for an owner and/or operator of a venue (hereinafter referred to as a "proprietor") trying to attract consumers and entice return customers.

While customer freedom in selection of beverages can enhance customer experience at a venue, customer freedom can raise issues for a proprietor. Customer experience and interaction with an unattended beverage dispenser can affect a customer's opinion of a venue. Also, a proprietor may wish to control the amount of beverage dispensed at an unattended beverage dispenser. Misuse of self-service beverage dispensers can be expensive. Therefore, a proprietor may wish to restrict access to and dispensing from self-service dispensers to only those customers that have purchased beverage(s) from the proprietor. A proprietor may restrict access and beverage dispensing by providing customers with a machine readable item including coded data with information related to customer's ability to dispense beverage(s) from an unattended beverage dispenser.

In some instances, it may be desirable for a proprietor to limit the amount of items with coded data given to customers, for example, cards or cups, which include coded data. If these items are disposable, they may be expensive for a proprietor to purchase and may create trash or litter at a venue. If these items are re-useable, they may be expensive to maintain and re-program, and non-return of the re-usable items may be expensive for a proprietor. Also, if a customer loses his or her item, he or she may lose the ability to dispense beverages without the hassle of obtaining a new item. Ultimately, a proprietor may have to pass on a portion of the expense related to these machine readable items onto a customer for an unattended beverage dispensing system to be successful.

In some cases, the use of machine readable items may negatively affect a customer's experience with a venue and/or unattended beverage dispenser at a venue. Keeping track of a machine readable item may be a nuisance. And replacement of a lost machine readable item may be even more of a nuisance and may reduce the amount of time a customer is able to enjoy entertainment provided at the venue. Further, machine readable items may be susceptible to theft. And a stolen item may be even more of a hassle and nuisance than a lost item.

In addition to these possible issues with machine readable items given to customers, machine readable items may detract from a customer's interaction with an unattended beverage dispenser. Time and attention spent handling a machine readable item may unintentionally focus attention on the machine readable item and draw a customer's attention away from his or her experience with the beverage dispenser. Such customer attention on the machine readable item may detract from the customer's experience with an unattended beverage dispenser, which may offer multiple options and benefits to the customer. Missing out on these options and benefits may detract from the ideal experience a proprietor and/or manufacturer wishes a customer to experience.

In some embodiments, unattended beverage dispensers discussed herein identify and authenticate customers without the need for a proprietor to pass out machine readable items to customers. In some embodiments, unattended beverage dispensers discussed herein identify and authenticate customers based on one or more biometric characteristics (i.e., biometric data) of a customer. Eliminating the need for a customer to carry a machine readable item in order to dispense beverages at an unattended beverage dispenser may enhance customer experience and reduce cost for a proprietor. Such hands-free identification may create a seamless customer-friendly experience between an unattended beverage dispenser and a customer.

In some embodiments, one or more biometric characteristics of a customer may be associated with a customer account. The customer account may include details related to the amount of beverage purchased by a customer. The customer account may also include at least one beverage dispensing rule for the customer. The beverage dispensing rule may be based on the amount of beverage purchased by the customer. For example, the beverage dispensing rule may restrict the amount of beverage a customer may dispense based on the amount of beverage the customer purchased (e.g., a certain volume of beverage(s) or a number of beverage re-fills).

Moreover, embodiments discussed herein may prevent unauthorized customers form "piggybacking" on authorized customer purchased drink allowances at an unattended beverage kiosk. "Piggybacking" occurs when a person, intentionally or unintentionally, dispenses a beverage using another person's account, thereby syphoning off purchased beverage dispensing allowance from an unexpecting person. Piggybacking, intentional or unintentional, may be controlled by associating a beverage pour with a specific authorized customer and terminating dispensing after that customer's interaction with a beverage dispenser is complete.

FIG. 1 shows a beverage dispensing system 100 according to an embodiment. Beverage dispensing system 100 may be located at a venue and may include one or more beverage dispensers 110. Beverage dispensers 110 may be any of the beverage dispensers discussed herein (e.g., beverage dispensers 300, 400, or 500). As used herein, a "beverage" includes any consumable free-flowing liquid or semi-liquid product, including, but not limited to, soft drinks, water, carbonated water, dairy beverages, juices, alcoholic beverages, sports drinks, smoothies, coffee beverages, tea beverages, and milkshakes. As discussed herein, beverage dispenser(s) 110 may identify and authenticate a customer who has purchased one or more beverages. In some embodiments, beverage dispensers(s) 110 may identify and authenticate a customer based one or more biometric characteristics of the customer. A user interface 122 of beverage dispenser 110 may facilitate identification and authentication of a customer.

User interface 122 may include an electronic display screen 123 for displaying information to a customer (e.g., a liquid crystal display (LCD) or a light emitting diode (LED) display, which may be a touch screen display). In some embodiments, user interface 122 may include one or more actuators 128 (e.g., buttons, levers, handles, or icons on a touch screen, which may or may not be integrated into display screen 123) for receiving commands from a customer. In some embodiments, actuator(s) 128 of user interface 122 may be configured to initiate dispensing of a beverage from a dispensing nozzle 112 of dispenser 110.

A controller 120 may be configured to control operations (e.g., customer identification and authentication, and dispensing of a beverage and/or ice) of dispensing system 100. In some embodiments, controller 120 may be configured to control a plurality of beverage dispensers 110. In some embodiments, individual beverage dispensers 110 may have individual controllers 120, which may be controlled by a central controller (e.g., remote controller 124).

Controller 120 may be configured to control display screen 123 and receive commands from user interface 122. User interface 122 may allow a customer to control various aspects of dispensing system 100. For example, user interface 122 may allow a customer to initiate dispensing of a beverage and/or ice. User interface 122 may also allow a customer to select different beverage types and/or ingredients for dispensing. A customer may customize his or her beverage by selecting beverage and/or ingredient options on user interface 122. In some embodiments, user interface 122 may allow a customer to input a user identification code (e.g., a user name or phone number) to identify a particular customer. In some embodiments, user interface 122 may include one or more readers or scanners 126 for reading a machine readable item for identifying a customer. Machine readable items may include, but are not limited to, a barcode, a magnetic strip, a quick response (QR) code, a radio frequency identification (RFID) tag, a Bluetooth-enabled device (e.g., a cell phone), a Bluetooth Low Energy (BLE) device, or an ultrasound communication device, (e.g., a device having LISNR® ultrasound technology).

In some embodiments, user interface 122 may include one or more biometric sensors 125 for identifying one or more biometric characteristics of a customer. Biometric sensor(s) 125 may include, for example but not limited to, a fingerprint reader, a finger vein scanner, a retinal scanner, an iris scanner, a camera (for taking a photo and/or recording a video), or a microphone. The biometric characteristic(s) of a customer may include a fingerprint, a finger vein pattern, a retinal profile, an iris profile, a face profile, and a voice profile.

Controller 120 in communication with biometric sensor(s) 125 may authenticate a customer based on the biometric characteristic(s) identified by the biometric sensor(s) 125. After authenticating a customer, controller 120 may associate the authenticated customer with a customer account (e.g., one of the customer accounts shown in FIG. 2). In some embodiments, controller 120 may locate a particular customer account in a database (e.g., database 150) based on the biometric characteristic(s) identified by the biometric sensor(s) 125. Controller 120 may locate a particular customer account by comparing identified biometric characteristic(s) of a customer against a database of authorized biometric characteristics. After authenticating a customer, controller 120 may allow beverage dispensing based on one or more beverage dispensing rule associated with the customer's account.

In some embodiments, user interface 122 may include electronic display screen 123 and biometric sensor 125 may include a camera for optically identifying the biometric characteristic of the customer. In some embodiments, electronic display screen 123 may be configured to display an image or video captured by the camera. For example, electronic display screen 123 may be configured to display a picture of a customer taken by the camera of biometric sensor 125. The picture of a customer taken by the camera may be analyzed by controller 120 to determine whether or not a customer is authorized to dispense beverage(s) from beverage dispenser 110. In other words, controller 120 may identify and authenticate a customer based on the picture. For example, controller 120 may identify and authenticate a customer based on facial recognition of the customer obtained by analyzing the picture taken by the camera of biometric sensor 125. In such embodiments, user interface 122 may prompt a customer to pose for a picture (e.g., visual, verbal, or audible indication for the customer to look at the camera) when the customer approaches beverage dispenser 110. For example, a textual message may appear on electronic display screen 123, a light or visual display may illuminate on the electronic display screen 123, or a verbal instruction to "look at the camera" may be provided by a speaker on beverage dispenser 110.

In some embodiments, an actuator 128 of user interface 122 may include a biometric sensor 125. For example, a button or touch screen of user interface 122 may include a fingerprint reader or a finger vein scanner. In such embodiments, upon actuation of actuator 128, controller 120 may be configured to identify and authenticate the customer, associate the authenticated customer with a customer account, and initiate dispensing of beverage(s) from beverage dispenser 110. In such embodiments, customer identification, customer authorization, and beverage dispensing initiation may only require a single action by a user (e.g., all these steps may be performed "at the push of a button").

In some embodiments, upon sensing that an actuator 128 has been disengaged by a customer, controller 120 may be configured to cease beverage dispensing and record an amount of beverage(s) dispensed from beverage dispenser 110. In some embodiments, controller 120 may be configured to update a beverage dispensing rule based on the beverage(s) dispensed from beverage dispenser 110. In such embodiments, controller 120 may be configured to track beverage(s) dispensed by an authenticated customer and update the customer's beverage dispensing rule based on beverage(s) dispensed by the authenticated customer. In embodiments including an actuator 128 with an integrated biometric sensor 125, piggybacking may be prevented by ceasing dispensing and pausing or ending a dispensing session when a customer's biometric characteristic (e.g., fingerprint) is no longer identified by the sensor 125 of actuator 128. For example, when a customer lifts his or her finger off of an actuator, additional dispensing may be prevented unless the same customer presses the actuator, or a new customer is identified and authenticated. In some embodiments, a dispenser 110 including a plurality of actuators 128 with integrated biometric sensors 125 may allow multiple customers to be identified and authenticated at the same time. And, in such embodiments, multiple customers may dispense beverages at the same time and each customer's beverage consumption may be separately tracked by system 100.

In some embodiments, dispensing system 100 may include a remote controller 124. Remote controller 124 may be, for example, a local area computer, a network computer, or a server. Remote controller 124 may be in communication with controller 120 via a wired or wireless connection. Remote controller 124 may send information to controller 120. For example, remote controller 124 may be configured to send software updates to controller 120. Software updates may provide controller 120 with updated user interface software for displaying information to users on display screen 123. In some embodiments, software updates may include, for example, new icons for new types of beverages that may be dispensed from beverage dispenser 110, new ingredients (e.g., flavors) that may be added to a beverage dispensed from beverage dispenser 110, or new beverage costs. In some embodiments, software updates may include drink construction formulations for new beverage products.

In some embodiments, remote controller 124 may collect dispenser information from controller 120. Dispenser information collected from controller 120 may include but is not limited to: (1) amounts of beverages and types of beverages dispensed by beverage dispenser 110, (2) types of ingredients and amounts of ingredients 142 remaining in ingredient sources 140 of dispensing system 100, (3) customer biometric characteristics, and (4) data from sensors 127. In some embodiments, remote controller 124 may store the dispenser information. In some embodiments, the dispenser information may be used to track customer preferences. In some embodiments, remote controller 124 may be in communication with a plurality of dispensing systems 100, which may or may not be remotely located from each other (e.g., located at different venues).

Controller 120 and/or remote controller 124 may include or may be in communication with a database 150. Database 150 may be configured to store a plurality of authorized biometric characteristic profiles. FIG. 2 illustrates exemplary authorized biometric characteristic profiles for exemplary customers. Each of the authorized profiles may include one or more biometric characteristics (biometric IDs) and a customer account. And each customer account may include one or more of: a beverage dispensing rule, a beverage dispensing restriction, a promotional beverage allowance, and customer preferences. In some embodiments, customers may be assigned a customer number, which may be used by system 100/database 150 to track customer biometric characteristics and accounts.

A beverage dispensing rule is a rule that dictates the amount of beverage an authorized customer may dispense from a beverage dispenser described herein. A beverage plan associated with a customer may include one or more beverage dispensing rules associated with the plan. Beverage dispensing rules may include, for example, a volume-based dispensing rule, a re-fill allowance rule, a geographic location-based dispensing rule, a time-based rule, a prepaid credit dispensing rule, or an unlimited dispensing rule. In some embodiments, a customer account may include a plurality of beverage dispensing rules. For example, a customer account may include a geographic location-based dispensing rule paired with a time-based rule for a beverage plan that allows a customer to dispense beverage(s) at a particular venue for a particular time-period (e.g., for a single day). As another example, a customer account may include a volume-based dispensing rule paired with a time-based rule that allows a customer to dispense up to a particular volume of beverage (e.g., 120 ounces) within a particular time-period (e.g., during a 4-hour window). Beverage dispensing rules may be stored and updated in database 150. In some embodiments, a beverage plan associated with a customer may be purchased. In some embodiments, a beverage plan associated with a customer may be provided to the customer as part of a promotion. In some embodiments, a beverage plan associated with a customer may be provided to the customer as part of a related purchase. For example, the beverage plan may be provided to the customer in connection with the purchase of a ticket to an event or a venue, such as, an amusement park, for example.

A volume-based dispensing rule limits the volume of beverage a customer is allowed to dispense from beverage dispenser(s) 110. For example, a customer may purchase or receive a beverage plan that entitles the customer to 40 ounces of beverage, 80 ounces of beverage, 120 ounces of beverage, or 200 ounces of beverage. In such embodiments, controller 120 and/or remote controller 124 may track a customer's volumetric beverage consumption (dispensed beverages) by tracking the volume of beverage(s) dispensed after a customer at a beverage dispenser 110 is identified and authenticated. By tracking the volume of beverages dispensed by an authenticated customer, the volume dispensed can be subtracted from a customer's entitled beverage volume, thereby updating the customer's beverage dispensing rule. For example, if a customer purchases or receives a beverage plan that entitles the customer to 80 ounces of beverage, and the customer dispenses 13 ounces of beverage, his or her volume-based beverage dispensing rule is updated to reflect the customer is only entitled to 67 more ounces of beverage. Additional beverage dispensing would decrease the volume amount in the same fashion.

A re-fill allowance rule limits the number of fixed-volume beverage pours a customer is allowed to dispense from beverage dispenser(s) 110. For example, a customer may purchase a beverage plan that entitles the customer to two 12 ounce re-fills, five 12 ounce re-fills, two 20 ounce re-fills, or five 20 ounce re-fills. In such embodiments, controller 120 and/or remote controller 124 may track a customer's re-fill consumption (dispensed beverages) by tracking the number of re-fills dispensed after a customer at a beverage dispenser 110 is identified and authenticated. By tracking the fixed-volume re-fills dispensed by the authenticated customer, the number of re-fills consumed by a customer can be subtracted from the customer's entitled re-fill allowance, thereby updating the customer's beverage dispensing rule. For example, if a customer purchases or receives a beverage plan that entitles the customer to five 12 ounce re-fills, and the customer dispenses one 12 ounce re-fill, his or her re-fill allowance rule is updated to reflect the customer is only entitled to four more 12 ounce re-fills. In some embodiments, a customer may purchase or receive a beverage plan that automatically re-loads his or her re-fill allowance after a certain time has elapsed. For example, a beverage dispensing plan may entitle a customer to five 12 ounce re-fills every 24 hours.

A geographic location-based rule limits a customer to dispensing from beverage dispenser(s) 110 located at one or more specific geographic locations. For example, a customer may purchase or receive a beverage plan that entitles the customer to dispense beverages at a particular venue (e.g., a theme park, stadium, or college campus). In such embodiments, a customer may be able to dispense beverages from any beverage dispenser located at the particular venue.

A time-based rule limits the time window during which a customer is allowed to dispense beverage dispenser(s) 110. For example, a customer may purchase or receive a beverage plan that entitles the customer to dispense beverages for 24 hours, 48 hours, or a week. In some embodiments, a customer may purchase or receive a beverage plan that entitles the customer to dispense beverages for a venue-specific time window. For example, the venue-specific time window may be a school semester at a college campus, a concert series at a concert venue, a seasonal window at a theme park, or for the length of a sports tournament at a stadium. In some embodiments, a time-based rule may allow unlimited dispensing during a time window (e.g., unlimited beverage pours during a college semester). In some embodiments, a time-based rule may be paired with a re-fill allowance or volume-based rule to limit the maximum amount of beverage that may be dispensed during a time window.

A prepaid credit dispensing rule limits the volume of beverage a customer is allowed to dispense from beverage dispenser(s) 110 based on a price/unit of beverage purchased or received by a customer. The unit may be, for example, a volume or a re-fill. For example, a customer may purchase or receive a beverage plan with a $10, $20, $50, or $100 credit that entitles the customer to dispense beverage up to the credit amount. In such embodiments, controller 120 and/or remote controller 124 may track a customer's credit amount by tracking the amount of beverage dispensed after a customer at a beverage dispenser 110 has been identified and authenticated. For example, in a volume-based price system, the price per volume of a beverage may be 5 cents per ounce, 10 cents per ounce, or 15 cents per ounce. If a customer purchases or receives a beverage plan with a $10 credit, and the customer dispenses 10 ounces of beverage that costs 5 cents per ounce, his or her dispensing rule is updated to reflect a credit of $9.50. Additional beverage dispensing would decrease the credit amount in the same fashion.

A prepaid credit based dispensing rule may facilitate the option of charging different prices for different drink types. For example, some beverages may cost 5 cents per ounce and other beverages may cost 10 cents per ounce. In some embodiments, user interface 122 may display the cost per ounce for different beverages, and a customer may make choices based on his or her preferences and cost. In some embodiments, a prepaid credit dispensing rule may entitle a customer to a fixed price per volume. In some embodiments, a prepaid credit dispensing rule may entitle a customer to a variable price per volume. The variable price per volume may increase or decrease over time for the same and/or different beverages.

An unlimited beverage dispensing rule allows an authenticated customer to dispense unlimited amounts of beverage(s) from beverage dispenser(s) 110. Often times an unlimited beverage dispensing rule may be paired with another rule, such as a time-based rule or geographic location-based rule.

In some embodiments, a purchased beverage plan may include a beverage dispensing restriction. Beverage dispensing restrictions may restrict the amount and/or kind of beverage that may be dispensed by a customer. For example, a parent or guardian may purchase or receive a beverage plan the limits the amount of soft drink a child may dispense. Beverage dispensing restrictions include, but are not limited to, a maximum volume allowance restriction, a re-fill allowance restriction, and a beverage type restriction. Maximum volume and re-fill allowance restrictions limit the amount of beverage a customer may dispense. In some embodiments, a maximum volume or re-fill allowance restriction may include a time component. For example, a maximum volume or number of re-fills per X number of minutes or Y number of hours. A beverage type restriction may allow dispensing of only certain types of beverages, for example, non-diet beverages only, diet beverages only, beverages with natural sweetener only, beverages with artificial sweetener only, zero calorie beverages only, or caffeine-free beverages only. In some embodiments, a purchased or received beverage plan may include a plurality of beverage restrictions. For example, a beverage volume restriction may be paired with a beverage type restriction. In such an embodiment, a certain type of beverage (e.g., non-diet beverages) may be dispensed up to a certain volume (e.g., 20 ounces per 24 hours), and thereafter only other types of beverage (e.g., diet beverages) may be dispensed. Beverage dispensing restrictions may be added to, stored, and updated in database 150.

In some embodiments, a customer account may include one or more promotional beverage allowances. In some embodiments, promotional beverage allowances may be associated with customer beverage plans. In some embodiments, promotional beverage allowances may be gifted to customers based on a loyalty or reward program. In some embodiments, promotional beverage allowances may be gifted to customers as part of a marketing campaign. Promotional beverage allowances may include, for example, a free re-fill or a free volume of beverage (e.g., 20 ounces). Promotional beverage allowances may be added to, stored, and updated in database 150.

In some embodiments, a customer account may include one or more customer preferences. Customer preferences may include, for example, but not limited to, a customer's favorite beverage type(s), favorite beverage combinations or recipes, most recent beverage selections, preferred language, or preferred display screen configuration. In some embodiments, electronic display screen 123 may display information based on an authenticated customer's preferences. In some embodiments, electronic display screen 123 of user interface 122 may display beverage selections for an identified customer's favorite drinks in a quick access category portion of electronic display screen 123. In some embodiments, most recent beverage selections for an identified customer may be displayed in a quick access portion of electronic display screen 123.

A customer may set up and/or update a customer profile (e.g., a biometric characteristic profile) prior to arriving at a venue or at the venue. In some embodiments, a beverage dispenser 110 may allow a customer to set up and/or update his or her profile. In some embodiments, beverage dispenser 110 may collect information for customer profiles. In some embodiments, a customer may set up and/or update his/her profile on a mobile device, such as a mobile phone or a tablet computer. In any event, the customer profile and/or updates may be sent to and stored in database 150 for access by controller 120 and/or remote controller 124.

In some embodiments, a customer may purchase or receive a beverage plan in-person at a venue. In some embodiments, a customer may purchase or receive a beverage plan online. In some embodiments, a customer may download and store a mobile device application on his or her personal device 160 that includes computer readable media, which when executed, is configured to collect profile data and send the data to database 150. In some embodiments, the device application connects to a database of available beverage plans and a customer may select a beverage plan they wish to purchase or receive via the mobile device application.

Biometric characteristic(s) of a customer may be collected prior to the customer arriving at a venue or when a customer is at a venue. For example, in some embodiments, a customer's biometric characteristic(s) may be collected by a customer's personal device 160 (e.g., a mobile phone or tablet computer). In such embodiments, biometric sensors of the customer's personal device 160 may collect biometric data and send the biometric data to database 150. In some embodiments, a customer may download and store a mobile device application which includes computer readable media configured to collect and send biometric data to database 150. For example, when purchasing or receiving a beverage plan online using his/her personal device 160, a customer might upload a biometric characteristic to database 150 (e.g., a picture of a thumbprint, a fingerprint profile captured using his or her personal device's fingerprint reader, a picture of his or her face captured using his or her personal device's camera, or a voice sample).

In some embodiments, biometric characteristics of a customer may be collected at a venue. In some embodiments, a beverage dispenser 110 may be configured to collect a customer's biometric characteristic(s). In such embodiments, biometric sensor(s) 125 of beverage dispenser 110 may collect biometric data and controller 120 and/or remote controller 124 may send the biometric data to database 150. For example, at a venue, a customer may be able to register biometric data using a biometric sensor 125 associated with a beverage dispenser 110 (e.g., a customer may scan his or her fingerprint on a fingerprint reader).

In some embodiments, a customer's personal device 160 with a mobile device application stored on device 160 may interact with a dispenser 110. In some embodiments, a customer may initiate communication between his or her personal device 160 and select a beverage plan. Dispenser 110 and personal device 160 may be configured to communicate via, for example, Bluetooth, near-field communication (NFC), ultrasound, or Bluetooth Low Energy (BLE) methods. Bluetooth, near-field communication (NFC), and Bluetooth Low Energy (BLE) methods send messages using radio waves. In some embodiments, controller 120 and/or remote controller 124 associated with a beverage dispenser 110 may authenticate a customer and associate a customer with a customer profile based on data communicated from the customer's personal device 160 to beverage dispenser 110.

In some embodiments, a customer's personal device 160 may send a message in the form of a sound wave (e.g., an ultrasound message) to a beverage dispenser 110 when the customer is ready to dispense a beverage using a purchased or received beverage plan. The message may include identification data of the customer. After receipt of the customer message, and authentication of the customer, beverage dispenser 110 may unlock to allow dispensing. Then, beverage dispenser 110 may send a message in the form of a sound wave (e.g., ultrasound message) back to customer device 160 indicating the customer may begin dispensing a beverage. After dispensing is completed, beverage dispenser 110 may send another sound wave message to personal device 160 indicating one or more characteristics of the dispensed beverage, for example, the volume, type, dispensing time, beverage cost, etc. The customer's beverage dispensing rule may then be updated based on the characteristic(s). In such embodiments, dispenser 110 may not be in communication with database 150 and controller 120 of dispenser 110 may rely on a customer's personal device 160 in order to receive and send information to and from database 150. In such embodiments, the customer's personal device 160 may relay information from database 150 to dispenser 110, and vice versa. This two-way communication between dispenser 110 and personal device 160 may be used to identify a customer, associate the customer with a customer account, and track the customer's beverage consumption.

In some embodiments, dispenser 110 may be connected to database 150 and dispenser 110 may receive one or more sound wave messages from a customer's personal device 160 that identify the personal device 160 to dispenser 110. In such embodiments, a customer may approach a dispenser 110 and present his or her personal device 160, which has a mobile application stored thereon with an associated customer account. After approaching dispenser 110, the customer may instruct his or her personal device 160 to emit one or more sound wave messages to dispenser 110. The sound wave message(s) from device 160 include coded information related to the customer's profile that controller 120 of dispenser 110 uses to identify the customer's personal device 160, and therefore the customer associated with the personal device 160. In such embodiments, dispenser 110 is connected to database 150 and controller 120 and/or remote controller 124 cross-references the identified customer against what his or her drink plan is and authenticates a customer. And, after dispensing is completed by the authenticated customer, beverage dispenser 110 may send a message to database 150 indicating one or more characteristics of the dispensed beverage, for example, the volume, type, dispensing time, beverage cost, etc. A customer may indicate dispensing is completed by pressing a button or icon on user interface 122 of dispenser 110. The one-way communication from customer device 160 to dispenser 110 in such embodiments may be used to identify a customer, associate the customer with a customer account, and track the customer's beverage consumption.

In some embodiments, the sound wave messages sent between a customer's personal device 160 and a dispenser 110 may be inaudible to a human ear. In such embodiments, the sound wave messages may have a frequency outside the range of 20 hertz (Hz) to 20 kHz. The one- and two-way communication between a personal device 160 and dispenser 110 may be accomplished by wireless communication techniques other than sound wave messages. For example, the one- and two-way communication may be accomplished via Bluetooth, near-field communication (NFC), or Bluetooth Low Energy (BLE) messages.

In some embodiments, a customer's personal device 160 with a mobile device application stored on device 160 may be used to access database 150 and track the customer's dispensing at a beverage dispenser 110. In such embodiments, a customer may open the mobile device application and select a purchased beverage plan from which to consume purchased beverage. Then, after selecting a purchased beverage plan, the customer may identify a particular beverage dispenser 110 from which to dispense beverages. Based on the selected beverage plan and beverage dispenser 110, controller 120 and/or remote controller 124 may determine whether or not the customer is authorized to dispense beverage(s) from the dispenser 110. If the customer is authorized by controller 120 and/or remote controller 124, the beverage dispenser 110 is unlocked and beverage dispensing at the beverage dispenser 110 is permitted.

In some embodiments, to identify a beverage dispenser 110, a customer may enter a pin number associated with a particular dispenser 110 using a mobile device application on his or her personal device 160. In such embodiments, database 150 may store pin numbers for all beverage dispenser(s) 110 and controller 120 and/or remote controller 124 may query database 150 to determine whether or not a customer's beverage plan allows the customer to dispense from a particular dispenser 110.

In some embodiments, dispenser(s) 110 may include machine readable indicia (e.g., a barcode or QR code) displayed on dispenser(s) 110 with coded data identifying particular dispensers. A customer may scan the machine readable indicia with his or her personal device 160 to identify a particular beverage dispenser from which he or she wishes to dispense. In such embodiments, database 150 may store barcode or QR code data for all beverage dispenser(s) 110 and controller 120 and/or remote controller 124 may query database 150 to determine whether or not a customer's beverage plan allows the customer to dispense from a particular dispenser 110.

In some embodiments, a dispenser 110 may include an ultrasound emitter (e.g., a LISNR® device) configured to emit sound waves readable by a corresponding ultrasound decoder (e.g., a LISNR® device). A customer may activate an ultrasound decoder on his or her personal device 160 to identify a particular beverage dispenser from which he or she wishes to dispense. In such embodiments, database 150 may store unique ultrasound identifiers for all beverage dispenser(s) 110 and controller 120 and/or remote controller 124 may query database 150 to determine whether or not a customer's beverage plan allows the customer to dispense from a particular dispenser 110.

In some embodiments, a customer may swipe a magnetic strip card containing purchased beverage plan information at a beverage dispenser 110. Based on the information on the magnetic strip, controller 120 and/or remote controller 124 may determine whether or not a customer is authorized to dispense beverages. If authorized, the customer may dispense beverages, and after dispensing, the customer's purchased beverage plan may be updated in database 150. In some embodiments, the magnetic strip may be a read/write magnetic strip and purchased beverage plan information may be updated and stored on the card. In some embodiments, a handled item (e.g., a card, a fob, or customer's personal device 160) may emit a magnetic signal mimicking swiping of magnetic strip card (e.g., like Samsung's Loop-Pay technology having magnetic secure transmission).

In some embodiments, dispensing system 100 may include an ice dispenser 114 coupled to an ice reservoir 118. Ice dispenser 114 may include an ice chute 116 coupled to ice reservoir 118. A valve 117, such as a guillotine-type door, may control the flow of ice from ice reservoir 118 into ice chute 116.

Dispensing system 100 may include one or more base liquid sources 130. Base liquid sources 130 may be, but are not limited to, a tap water source (e.g., tap water line) and a carbonated water source (e.g., carbonated water reservoir or carbonator). Base liquid sources 130 may be coupled to dispenser 110 via base liquid delivery conduits 134. Valves/pumps 135 in communication with base liquid delivery conduits 134 may be configured to control the flow of base liquid through base liquid delivery conduits 134 and into beverage dispenser 110.

In some embodiments, a dispenser 110 may allow any customer to dispense plain water, ice, and/or plain carbonated water without identifying or authenticating the customer. In such embodiments, user interface 122 of dispenser 110 may allow any customer to select plain water, ice, and/or plain carbonated water, and controller 120 and/or remote controller 124 may initiate dispensing without identifying or authenticating the customer. If a customer desires to dispense beverage(s) other than plain water, ice, and/or plain carbonated water (e.g., soft drinks), controller 120 and/or remote controller 124 may require identification and authentication of the customer.

Dispensing system 100 may include one or more ingredient sources 140. Ingredient sources 140 may include a plurality of ingredients 142 (142-1 through 142-$n$). Ingredients 142 may include liquid ingredients, such as but not limited to, sweeteners (e.g., sugars or artificial sweeteners), syrups or flavorings (e.g., cola syrups or flavorings, brand soda syrups or flavoring (e.g., Pepsi®, Mountain Dew®, or Sierra Mist®), orange flavoring, lime flavoring, cherry flavoring, tea flavorings, etc.), or other liquid additives (e.g., vitamins, acids (e.g., citric acid), salts, electrolytes, or colorings). Ingredients 142 may be packaged within a container, such as but not limited to a cartridge or bag. Each ingredient 142 may be delivered to dispenser 110 via ingredient delivery conduits 144. Valves/pumps 145 in communication with ingredient delivery conduits 144 may be configured to control the flow of ingredients through ingredient delivery conduits 144 and into beverage dispenser 110.

In dispensing systems 100 including multiple beverage dispensers 110, beverage dispensers 110 may share base liquid source(s) 130 and/or ingredient source(s) 140. In some embodiments, each beverage dispenser 110 in a dispensing system 100 may have its own dedicated base liquid source(s) 130 and/or ingredient source(s) 140.

In some embodiments, controller 120 may include and/or may be configured to read sensors 127 associated with dispensing system 100. Sensors 127 may include pressure sensors for monitoring the pressure of a base liquid within a base liquid delivery conduit 134 and/or for monitoring the pressure of an ingredient within an ingredient delivery conduit 144. Sensors 127 may also include flow sensors (e.g., flow meters) for measuring the flow of base liquids and ingredients within delivery conduits 134 and 144, respectively. In some embodiments, sensors 127 may include level sensors for measuring the amount of each ingredient 142 remaining within an ingredient source 140. Sensors 127 may be used to track, for example, the volume of beverages dispensed by a customer, the number of re-fills dispensed by a customer, the type of beverages dispensed by a customer, and/or the length of time a customer dispensed beverage(s).

Sensors 127 may also include, but are not limited to sensors configured to monitor (1) carbon dioxide tank levels (e.g., one, two or more carbon dioxide regulators); (2) carbonization head pressure of a carbonator configured to carbonate water; (3) ambient temperature of a room (e.g., a backroom) in which base liquids and/or ingredients are stored (thereby monitoring whether one or more base liquids and/or ingredients are maintained at pre-determined temperature level or within a pre-determined temperature range); (4) water filtration system parameters (e.g., water pressure, differential pressure on filters); (5) pH of water or carbonated water; (6) the expiration date of an ingredient container (e.g., by reading a bar code associated within an ingredient container). Sensors 127 may be connected to an input/output ("I/O") rack or device, and may be configured to transmit or receive signals over a wired or wireless network to controller 120. Controller 120 may be configured to control the operations of dispensing system 100 based on data (e.g., pressure and flow values) collected by sensors 127.

In some embodiments, controller 120 may use the types of ingredients available at a beverage dispenser 110 and a customer account to customize the information displayed on display screen 123 for a specific customer. For example, a controller 120 may be configured to display a greeting message with the customer's name and the customer's most selected beverage choices (e.g., the customer's favorite beverages). In some embodiments, controller 120 may track customer preferences.

Controller 120 may control the dispensing of beverages and ice from beverage dispenser 110 and ice dispenser 114, respectively. Controller 120 may control the dispensing of ice by controlling valve 117. Controller 120 may open and close valve 117 in response to a user input received from user interface 122. Controller 120 may be configured to dispense different amounts of ice depending on a user's selection. For example, buttons or touchscreen icons may be provided on user interface 122 for a "standard" amount of ice, a "large" amount of ice, and a "small" amount of ice.

Controller 120 may control the dispensing of a beverage, which may be a mixture of a base liquid and one more ingredients 142 from beverage dispenser 110. Controller 120 may control the flow of a base liquid from base liquid sources 130 by controlling valve/pumps 135. In some embodiments, controller 120 may be configured to dispense ice from ice dispenser 114, via ice chute 116, and dispense a beverage (e.g., a base liquid mixed with one or more ingredients) from beverage dispenser 110 simultaneously.

Figure 3:
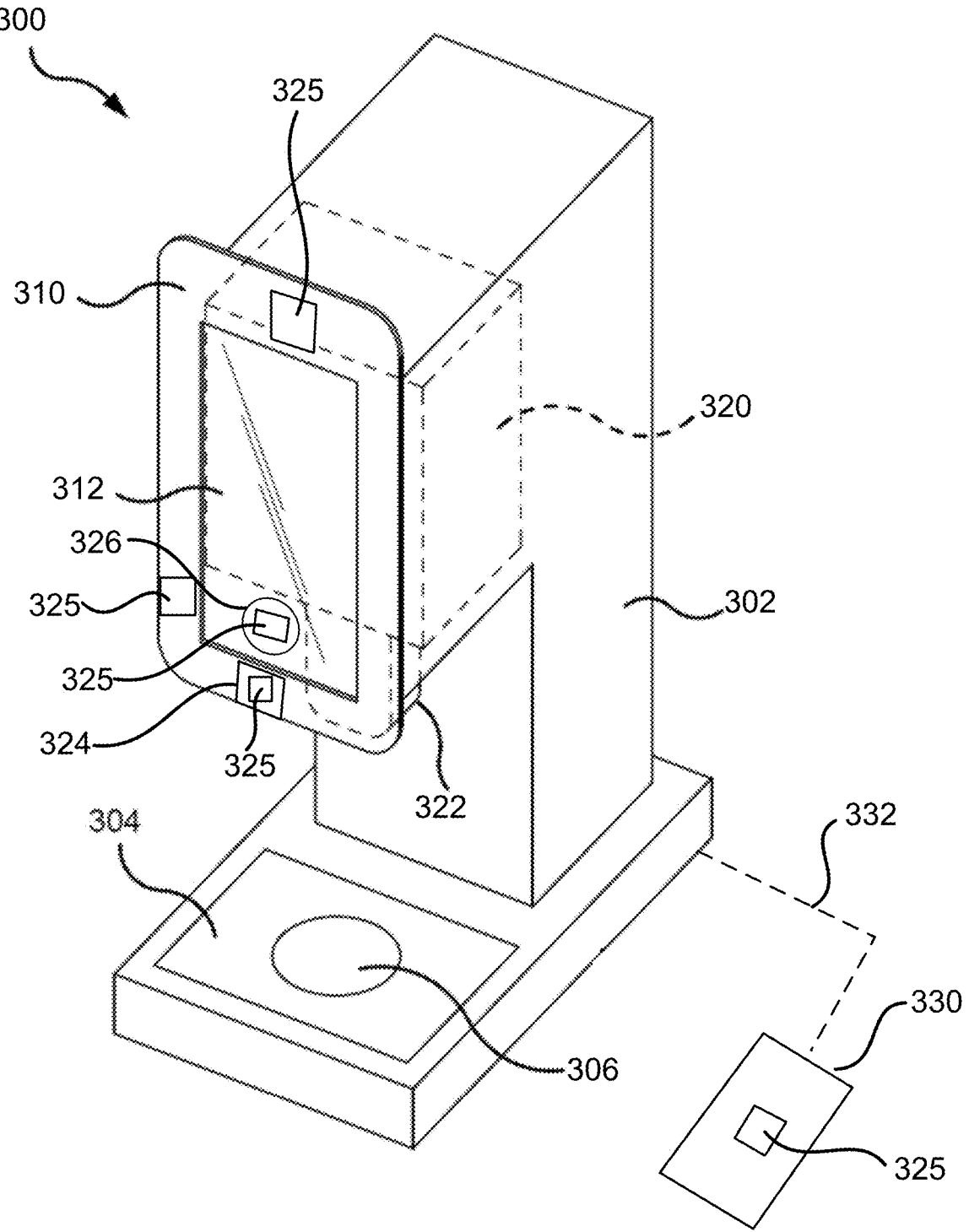
FIG. 3 illustrates a beverage dispenser according to some embodiments.

FIG. 3 shows a dispenser 300 according to some embodiments. Dispenser 300 may include a body 302 and a drip tray 304 with a dispense location 306 located within the area occupied by drip tray 304. A user (e.g., a customer) may place his or her container at dispense location 306 to receive his or her desired beverage and/or to receive ice. Body 302 may include a user interface 310 for receiving commands from a customer. User interface 310 may include an electronic display screen 312 configured to display information for a customer and/or receive commands from a customer. Electronic display screen 312 may be a touch screen, such as but not limited to, a liquid crystal display (LCD) touchscreen or a light emitting diode (LED) touchscreen.

Body 302 may house a dispensing manifold 320 including a dispensing nozzle 322 for dispensing a beverage at dispense location 306. In some embodiments, dispenser 300 may be configured to sit on a counter-top at a venue. In some embodiments, dispenser 300 may be a standalone dispenser having its own support structure for elevating it above floor level at a venue.

Dispenser 300 may be configured to dispense a beverage into a container placed underneath dispensing nozzle 322 of dispenser 300, such as on drip tray 304 at dispense location 306. A customer may make a selection of his or her desired beverage to be dispensed by dispenser 300 and/or initiate the dispensing of the beverage by interacting with electronic display screen 312. In some embodiments, ice for a beverage may be dispensed by the dispenser 300. As used herein, a "container" includes any suitable beverage container, such as but not limited to, a cup, a bottle, a flask, a jug, or a mug.

Dispenser 300 may include one or more biometric sensors 325. Biometric sensors 325 may be, for example, a fingerprint reader, a finger vein scanner, a retinal scanner, an iris scanner, a camera, a microphone, or other sensor configured to read a unique biometric characteristic of an individual. In some embodiments, one or more biometric sensors 325 may be located on dispenser 300. In some embodiments, one or more biometric sensors 325 may be located on an external device 330 in communication with dispenser 300 via a wired or wireless communication line 332. In some embodiments, external device 330 may be a pad including a biometric sensor 325, for example a fingerprint reader. In some embodiments, external device 330 may be coupled to an adjacent table top or wall within arm's reach of dispenser 300.

In some embodiments, electronic display screen 312 may include a biometric sensor 325, such as a fingerprint reader or a finger vein scanner. A biometric sensor 325 integrated with electronic display screen 312 may capture customer biometric data when a customer touches electronic display screen 312. In such embodiments, electronic display screen 312 may be a touch screen and the customer's contact with the touch screen may initiate reading of biometric data. In some embodiments, a customer's contact with a specific icon 326 on the touch screen may simultaneously or instantaneously initiate reading of biometric data. In some embodiments, icon 326 may be an icon for initiating reading of biometric data and initiating dispensing of a beverage from dispenser 300, after a customer's biometric data is authenticated. In other words, the touch screen icon 326 may serve to collect biometric data and as an actuator for initiating beverage dispensing from dispensing nozzle 322.

In some embodiments, dispenser 300 may include one or more actuators 324 for initiating beverage dispensing from dispensing nozzle 322. Actuator(s) 324 may be, for example, a push button or a capacitive touch button. In some embodiments, actuator(s) 324 may include a biometric sensor 325, such as a fingerprint reader or a finger vein scanner. A biometric sensor 325 integrated with actuator 324 may capture customer biometric data when a customer touches actuator 324. In such embodiments, actuator 324 may serve to collect biometric data and initiate beverage dispensing from dispensing nozzle 322, after a customer is authenticated.

Figure 4:
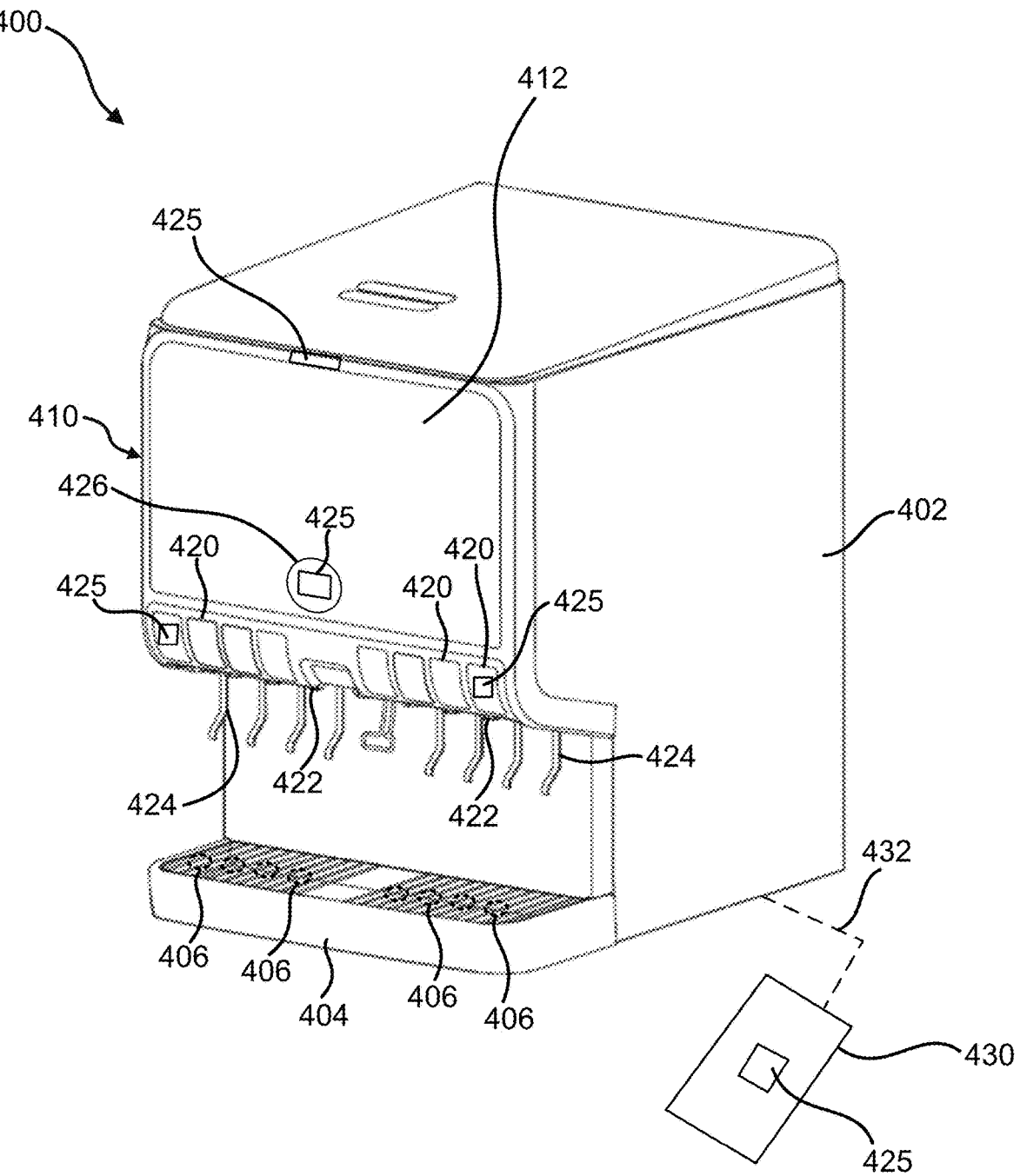
FIG. 4 illustrates a beverage dispenser according to some embodiments.

FIG. 4 shows a dispenser 400 according to some embodiments. Dispenser 400 may include a body 402 and a drip tray 404 with dispense locations 406 located within the area occupied by drip tray 404. A customer may place his or her container at a dispense location 406 to receive his or her desired beverage. Body 402 may include a user interface 410 for receiving commands from a customer. User interface 410 may include an electronic display screen 412, logos 420, and/or levers 424. Electronic display screen 412, logos 420, and/or levers 424 may be configured to display information for a customer and/or receive commands from a customer. In some embodiments, electronic display screen 412 may be a touch screen, such as but not limited to, a liquid crystal display (LCD) touchscreen or a light emitting diode (LED) touchscreen.

Dispenser 400 includes a plurality of dispensing nozzles 422 for dispensing the same or different beverages at respective dispense locations 406. In some embodiments, each dispensing nozzle 422 may be associated with a respective logo 420 that indicates the type of beverage that will dispense from a respective dispensing nozzle 422. In some embodiments, logos 420 may be buttons (e.g., push buttons or capacitive touch buttons) for initiating beverage dispensing from a dispensing nozzle 422. In some embodiments, dispenser 400 may be configured to sit on a counter-top at a venue. In some embodiments, dispenser 400 may be a standalone dispenser having its own support structure for elevating it above floor level at a venue.

Dispenser 400 may be configured to dispense a beverage into a container placed underneath a dispensing nozzle 422 of dispenser 400, such as on drip tray 404 at a dispense location 406. In some embodiments, a customer may initiate the dispensing of a beverage by pressing a logo 420. In some embodiments, actuating levers 424 may initiate the dispensing of a beverage from associated dispensing nozzles 422.

Dispenser 400 may include one or more biometric sensors 425. Biometric sensors 425 may be a fingerprint reader, a finger vein scanner, a retinal scanner, an iris scanner, a camera, a microphone, or other sensor configured to read a unique biometric characteristic of an individual. In some embodiments, one or more biometric sensors 425 may be located on dispenser 400. In some embodiments, one or more biometric sensors 425 may be located on an external device 430 in communication with dispenser 400 via a wired or wireless communication line 432. In some embodiments, external device 430 may be a pad including a biometric sensor 425, for example a fingerprint reader. In some embodiments, external device 430 may be coupled to a table top or wall within arm's reach of dispenser 400.

In some embodiments, electronic display screen 412 may include a biometric sensor 425, such as a fingerprint reader or a finger vein scanner. A biometric sensor 425 integrated with electronic display screen 412 may capture customer biometric data when a customer touches electronic display screen 412. In such embodiments, electronic display screen 412 may be a touch screen and the customer's contact with the touch screen may initiate reading of biometric data. In some embodiments, a customer's contact with an icon 426 on the touch screen may initiate reading of biometric data.

In some embodiments, logo(s) 420 may include a biometric sensor 425, such as a fingerprint reader or a finger vein scanner. A biometric sensor 425 integrated with logo 420 may capture customer biometric data when a customer touches logo 420. In such embodiments, logo 420 may serve to collect biometric data and initiate beverage dispensing from a dispensing nozzle 422, after a customer is authenticated.

Figure 5:
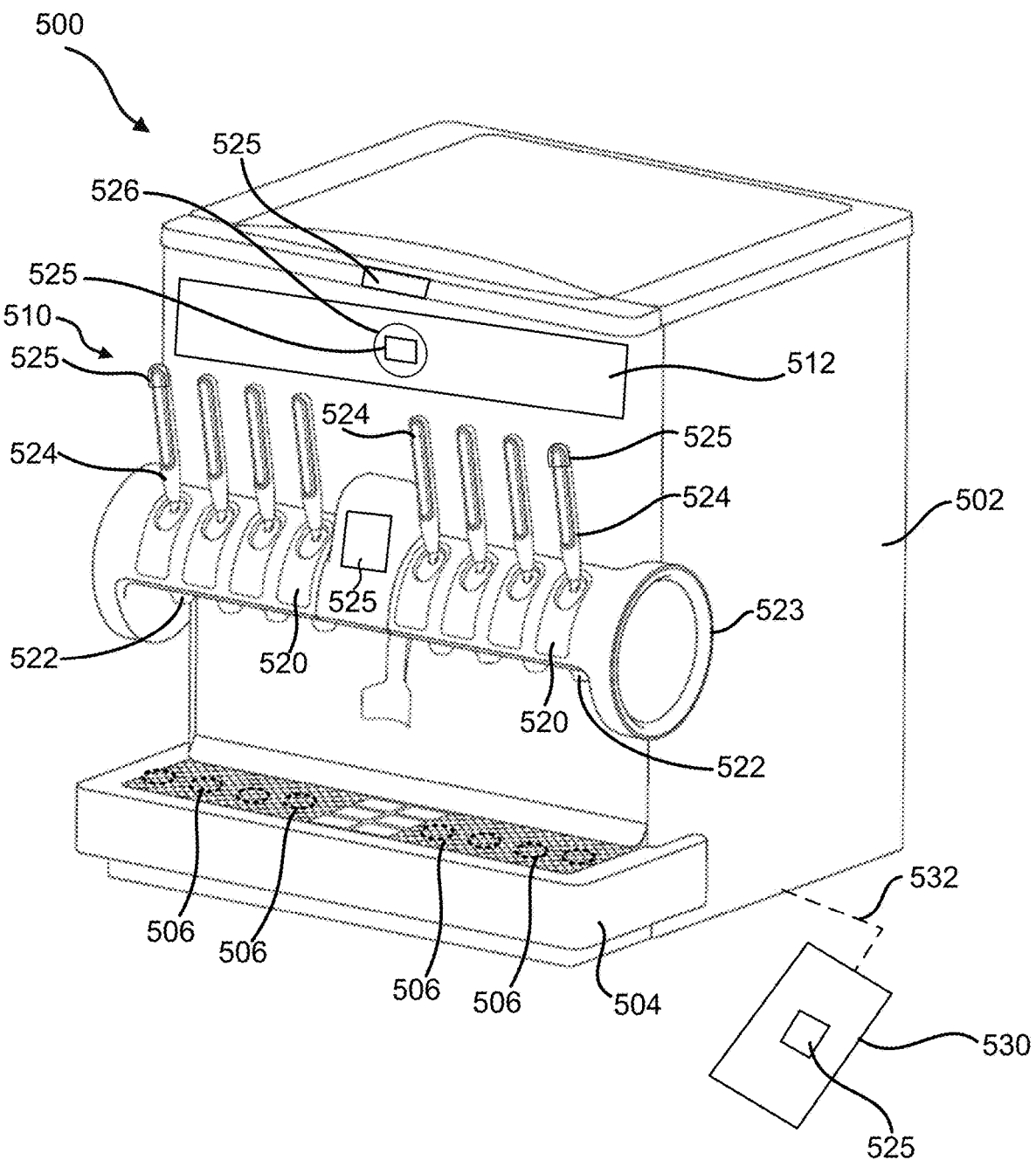
FIG. 5 illustrates a beverage dispenser according to some embodiments.

FIG. 5 shows a dispenser 500 according to some embodiments. Dispenser 500 may include a body 502 and a drip tray 504 with dispense locations 506 located within the area occupied by drip tray 504. A customer may place his or her container at a dispense location 506 to receive his or her desired beverage. Body 502 may include a user interface 510 for receiving commands from a customer. User interface 510 may include an electronic display screen 512 and handles 524. Electronic display screen 512 and/or handles 524 may be configured to display information for a customer and/or receive commands from a customer. In some embodiments, electronic display screen 512 may be a touch screen, such as but not limited to, a liquid crystal display (LCD) touchscreen or a light emitting diode (LED) touchscreen.

Dispenser 500 includes a plurality of dispensing nozzles 522 for dispensing the same or different beverages at respective dispense locations 506. In some embodiments, each dispensing nozzle 522 may be associated with a respective handle 524. In some embodiments, handles 524 may be pivotably coupled to a handle assembly 523. In some embodiments, handle assembly 523 may include logos 520 that indicate the type of beverage that will dispense from a respective dispensing nozzle 522 upon actuation of the corresponding handle 524. In some embodiments, dispenser 500 may be configured to sit on a counter-top at a venue. In some embodiments, dispenser 500 may be a standalone dispenser having its own support structure for elevating it above floor level at a venue.

Dispenser 500 may be configured to dispense a beverage into a container placed underneath a dispensing nozzle 522 of dispenser 500, such as on drip tray 504 at a dispense location 506. In some embodiments, a customer may initiate the dispensing of a beverage by actuating (e.g., pushing or pulling) a handle 524. The actuation of handles 524 may initiate the dispensing of a beverage from associated dispensing nozzles 522.

Dispenser 500 may include one or more biometric sensors 525. Biometric sensors 525 may be a fingerprint reader, a finger vein scanner, a retinal scanner, an iris scanner, a camera, a microphone, or other sensor configured to read a unique biometric characteristic of an individual. In some embodiments, one or more biometric sensors 525 may be located on dispenser 500. In some embodiments, one or more biometric sensors 525 may be located on an external device 530 in communication with dispenser 500 via a wired or wireless communication line 532. In some embodiments, external device 530 may be a pad including a biometric sensor 525, for example a fingerprint reader. In some embodiments, external device 530 may be coupled to a table top or wall within arm's reach of dispenser 500.

In some embodiments, electronic display screen 512 may include a biometric sensor 525, such as a fingerprint reader or a finger vein scanner. A biometric sensor 525 integrated with electronic display screen 512 may capture customer biometric data when a customer touches electronic display screen 512. In such embodiments, electronic display screen 512 may be a touch screen and the customer's contact with the touch screen may initiate reading of biometric data. In some embodiments, a customer's contact with an icon 526 on the touch screen may initiate reading of biometric data.

In some embodiments, handles(s) 524 may include a biometric sensor 525, such as a fingerprint reader or a finger vein scanner. A biometric sensor 525 integrated with handle 524 may capture customer biometric data when a customer grasps handle 524. In such embodiments, handle 524 may serve to collect biometric data and initiate beverage dispensing from a dispensing nozzle 522, after a customer's biometric data is authenticated. In some embodiments, biometric sensors 525 on handles 524 may be microphones for recording a customer's voice profile. In some embodiments, a biometric sensor 525 may be located on handle assembly 523 of dispenser 500.

Figure 6:
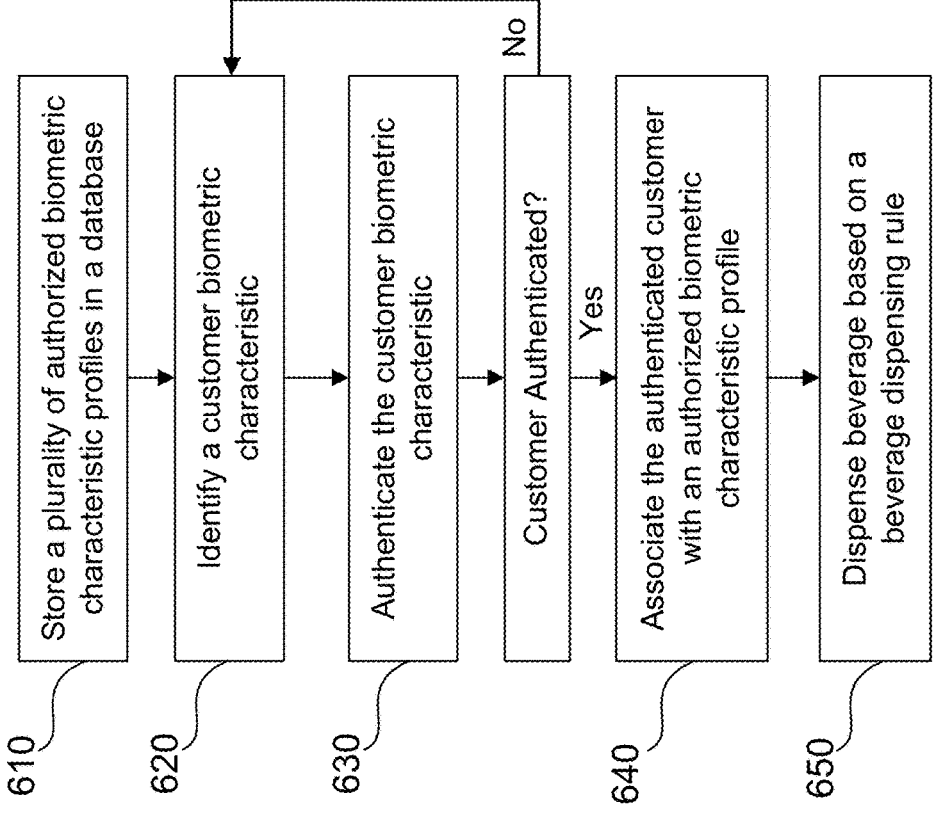
FIG. 6 is a flow chart illustrating a method of dispensing a beverage according to some embodiments.

FIG. 6 shows an exemplary method 600 for dispensing beverage(s) according to some embodiments. While method 600 is described in the context of collecting customer biometric data, any type of customer data discussed herein may be employed by the steps of method 600 to authentic a customer and dispense beverage(s) to the authenticated customer. For example, customer data read from a magnetic strip or received from a customer's personal device may be used to authenticate the customer and dispense beverages according to method 600.

In step 610, a plurality of authorized biometric characteristic profiles are stored in database 150. For example, the biometric characteristics profiles of FIG. 2 may be stored in database 150. Step 610 may also include collecting the data for the biometric characteristic profiles. For example, step 610 may include receiving a customer's request to purchase a particular beverage plan. When selecting a beverage plan for purchase, a customer may specify, among other things, the type of beverage rule(s) for a beverage plan and any beverage restrictions for the beverage plan. These customer selections may be stored in database 150 and associated with a particular customer account. Step 610 may also include collecting biometric data from customers as discussed herein. Based on information collected from a customer, a biometric profile including one or more biometric characteristics and a customer account with one or more beverage dispensing rules is created and stored in database 150.

In step 620, a customer biometric characteristic is collected at a beverage dispenser 110 with a biometric sensor 125, thereby identifying a customer to system 100. For example, customer number 041987 may approach a beverage dispenser 110 and place his or her finger on a fingerprint reader associated with the beverage dispenser 110. The finger printer reader may collect the customer's fingerprint, which identifies the customer to system 100. In some embodiments, electronic display screen 123 may instruct a customer to present a biometric characteristic to the beverage dispenser (e.g., instruct the customer to place his or her finger on a fingerprint reader).

In step 630, the customer at the beverage dispenser is authenticated by comparing the collected customer biometric characteristic(s) to the authorized biometric characteristic profiles in database 150. For example, controller 120 and/or remote controller 124 may compare the fingerprint scan collected from customer number 041987 to stored fingerprint scans in database 150 to determine if customer number 041987 has an authorized account with system 100. Also, in step 630, if an authorized account exists, controller 120 and/or remote controller 124 may determine the customer's beverage dispensing rule and whether or not the beverage dispensing rule has been exhausted. Step 630 may also include determining whether or not the customer number has a beverage dispensing restrictions or promotional allowances.

If an authorized account exists and the account's beverage dispensing rule is not exhausted, the customer is authenticated and method 600 proceeds to step 640. If no authorized account exists or an account's beverage dispensing rule is exhausted, the customer is not authenticated and method 600 returns to step 620. In some embodiments, electronic display screen 123 may display an indication that a beverage dispenser 110 is attempting to authenticate a customer. In such embodiments, display screen 123 may display the text "authentication in progress." In some embodiments, lights on a dispenser may indicate the status of an authentication process. For example, a yellow light may indicate that authentication is in progress, a green light may indicate that a customer has been authenticated, and a red light may indicate a customer has not been authenticated. If authentication fails, a customer may be instructed to attempt authentication again.

In step 640, the authenticated customer is associated with his or her particular authorized biometric characteristic profile in database 150. By associating the customer with his or her profile, system 100 can track beverage(s) dispensed by the customer. For example, dispensing actions made by customer number 041987, previously authenticated in step 630, are associated with his or her account in step 640. In step 640, controller 120 may inform system 100 that it has engaged in a dispensing session with an authenticated customer by actively pinging remote controller 124. Also, controller 120 may inform system 100 that dispensing from a particular dispenser 110 is being performed by a particular authenticated customer. This allows system 100 to track beverage dispensing by an authenticated customer.

In this manner, system 100 can restrict the customer's dispensing capabilities to only those authorized for his or her account. For example, if customer number 041987 has 20 ounces remaining in his or her beverage dispensing rule, beverage dispenser 110 may prevent additional dispensing after 20 ounces have been dispensed. As another example, if customer number 051393 attempts to dispense a beverage with natural sweeter, beverage dispenser 110 may prevent such dispensing because customer number 051393 has a "artificial sweetener only" beverage dispensing restriction. In some embodiments, display screen 123 may display an indication that a customer is not permitted to dispense a beverage or additional beverage.

In step 650, beverage is dispensed at beverage dispenser 110 based on the particular authorized biometric characteristic profile. After beverage dispensing is completed in step 650, controller 120 and/or controller 124 may record one or more characteristics of the dispensing session, for example, the volume, type, dispensing time, beverage cost, etc. The customer's beverage dispensing rule may then be updated in database 150 based on the characteristics. All or portions of step 640 may be performed before, after, and/or during step 650. In some embodiments, steps 640 and 650 may be performed simultaneously.

In some embodiments, controller 120 may be configured to allow beverage dispensing for a predetermined amount of time. And, once the predetermined amount of time expires, controller 120 may be configured to prevent beverage dispensing until a future customer is authenticated. In some embodiments, a dispensing session with an authenticated customer may time out if the customer does not complete dispensing within a maximum time limit. In other words, controller 120 may start a timer that expires after a certain time. In some embodiments, electronic display screen 123 of beverage dispenser 110 may display a timer extension icon to give a customer additional time. If a session times out, method 600 may return to step 620 to identify and authorize a new (or the same) customer. In some embodiments, electronic display screen 123 may include a "done" or "complete" button or icon. In some embodiments, a dispenser 110 may have a proximity sensor that recognizes a customer has left front of machine, thereby ending a dispensing session with the customer. One or more of these features may help prevent piggybacking by only leaving an authenticated customer's dispensing session open for a limited time.

Figure 7:
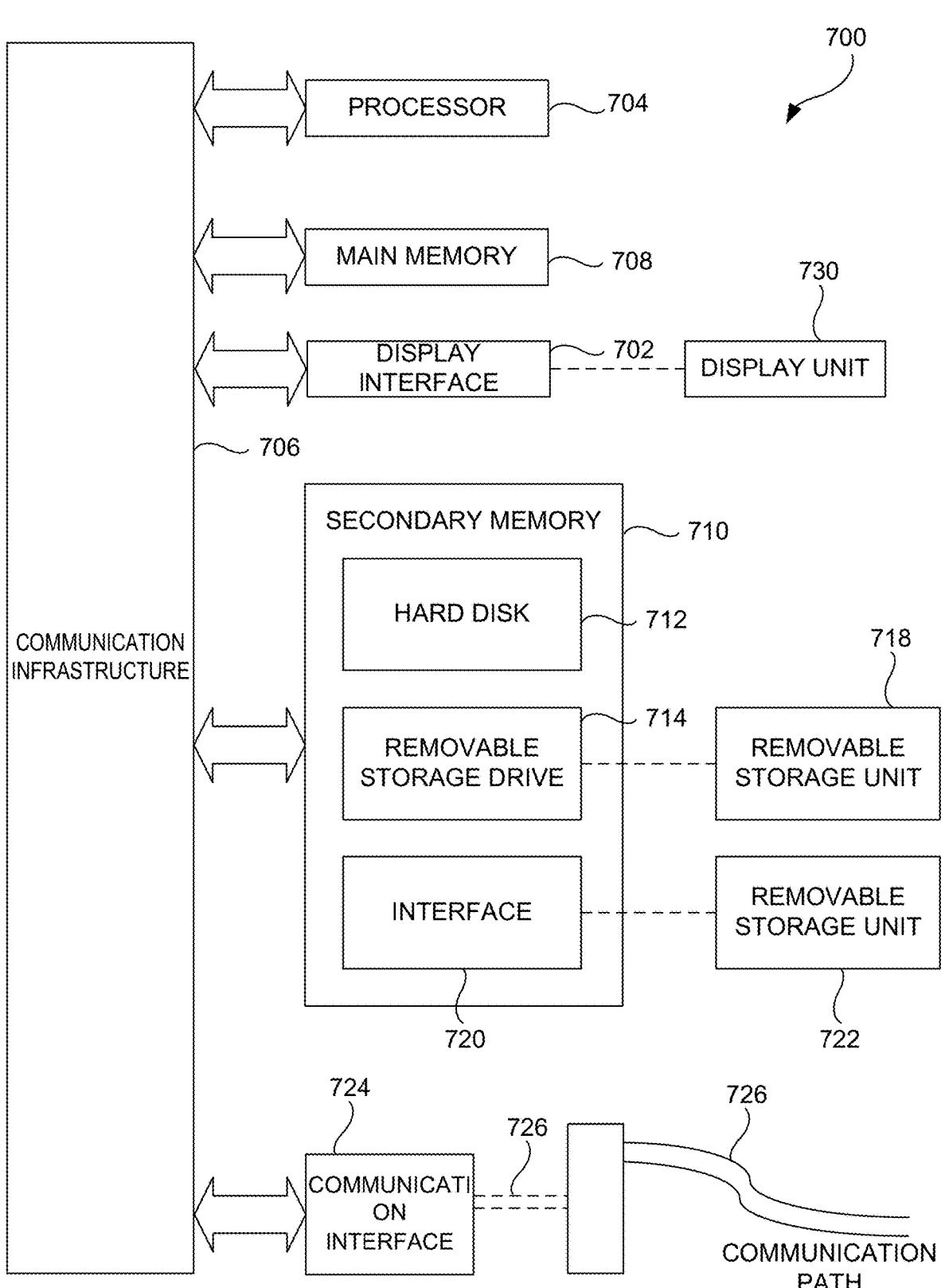
FIG. 7 is a schematic block diagram of an exemplary computer system in which embodiments may be implemented.

FIG. 7 illustrates an exemplary computer system 700 in which embodiments, or portions thereof, may be implemented as computer-readable code. For example, collection of customer data (e.g., biometric data), identification of a customer based on collected data, authentication of customer accounts, and/or tracking of customer accounts may be implemented in computer system 700 using hardware, software, firmware, tangible computer readable media having instructions stored thereon, or a combination thereof and may be implemented in one or more computer systems or other processing systems. Controllers discussed herein may be computer systems having all or some of the components of computer system 700 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 700. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. As will be appreciated by persons skilled in the relevant art, processor device 704 may also be a single processor in a multi-core/multiprocessor system, such system operating alone, or in a cluster of computing devices operating in a cluster or server farm. Processor device 704 is connected to a communication infrastructure 706, for example, a bus, message queue, network, or multi-core message-passing scheme.

Computer system 700 also includes a main memory 708, for example, random access memory (RAM), and may also include a secondary memory 710. Secondary memory 710 may include, for example, a hard disk drive 712, or removable storage drive 714. Removable storage drive 714 may include a floppy disk drive, a magnetic tape drive, an optical disk drive, a flash memory, or the like. The removable storage drive 714 reads from and/or writes to a removable storage unit 718 in a well-known manner. Removable storage unit 718 may include a floppy disk, magnetic tape, optical disk, a universal serial bus (USB) drive, etc. which is read by and written to by removable storage drive 714. As will be appreciated by persons skilled in the relevant art, removable storage unit 718 includes a computer usable storage medium having stored therein computer software and/or data.

Computer system 700 (optionally) includes a display interface 702 (which can include input and output devices such as keyboards, mice, etc.) that forwards graphics, text, and other data from communication infrastructure 706 (or from a frame buffer not shown) for display on display unit 730.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communication interface 724. Communication interface 724 allows software and data to be transferred between computer system 700 and external devices. Communication interface 724 may include a modem, a network interface (such as an Ethernet card), a communication port, a PCMCIA slot and card, or the like. Software and data transferred via communication interface 724 may be in the form of signals, which may be electronic, electromagnetic, optical, or other signals capable of being received by communication interface 724. These signals may be provided to communication interface 724 via a communication path 726. Communication path 726 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 718, removable storage unit 722, and a hard disk installed in hard disk drive 712. Computer program medium and computer usable medium may also refer to memories, such as main memory 708 and secondary memory 710, which may be memory semiconductors (e.g. DRAMs, etc.).

Computer programs (also called computer control logic) are stored in main memory 708 and/or secondary memory 710. Computer programs may also be received via communication interface 724. Such computer programs, when executed, enable computer system 700 to implement the embodiments as discussed herein. In particular, the computer programs, when executed, enable processor device 704 to implement the processes of the embodiments discussed here. Accordingly, such computer programs represent controllers of the computer system 700. Where the embodiments are implemented using software, the software may be stored in a computer program product and loaded into computer system 700 using removable storage drive 714, interface 720, and hard disk drive 712, or communication interface 724.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A beverage dispensing system, comprising:
a customer mobile device comprising a biometric sensor, wherein the biometric sensor is configured to collect a biometric characteristic of a customer, wherein the customer mobile device is configured to send data collected by the biometric sensor and comprising the biometric characteristic via a wireless communication link; and
a beverage dispenser comprising a wireless communication device configured to communicate with the customer mobile device via the wireless communication link,
wherein the beverage dispenser comprises a machine readable element identifying the beverage dispenser, and
wherein the customer mobile device comprises a mobile device application that is configured to scan the machine readable element at the beverage dispenser to identify the beverage dispenser and allow the customer to select the beverage dispenser through the mobile device application on the customer mobile device; and
a controller configured to:
wirelessly receive the data comprising the biometric characteristic collected by the biometric sensor of the customer mobile device from the customer mobile device via the wireless communication link,
associate the customer with a customer account based on the biometric characteristic collected by the biometric sensor of the customer mobile device, and
allow a beverage to be dispensed from the beverage dispenser after associating the customer with the customer account.

2. The beverage dispensing system of claim 1, wherein the controller is configured to compare the biometric characteristic against a database of authorized biometric characteristics.

3. The beverage dispensing system of claim 1, the biometric characteristic comprises at least one of a fingerprint, a finger vein pattern, a retinal profile, an iris profile, a face profile, or a voice profile.

4. The beverage dispensing system of claim 1, wherein the wireless communication link comprises a Bluetooth communication link, a near-field communication link, or an ultrasound communication link.

5. The beverage dispensing system of claim 1, wherein the machine readable element comprises a barcode, a magnetic strip, a quick response code, or a radio frequency identification tag.

6. The beverage dispensing system of claim 1, wherein the mobile device application is configured to allow the customer to select the beverage dispenser from a plurality of beverage dispensers through the mobile device application.

7. The beverage dispensing system of claim 1, wherein the beverage dispenser comprises the controller.

8. The beverage dispensing system of claim 1, the controller is configured to associate the customer with the customer account based on only the biometric characteristic.

9. The beverage dispensing system of claim 1, wherein the customer account comprises a customer preference selected from the group consisting of: the customer's favorite beverage types, the customer's favorite beverage recipes, or the customer's most recent beverage selection.

10. The beverage dispensing system of claim 9, wherein the beverage dispenser comprises an electronic display screen, and wherein the customer preference is displayed on the electronic display screen.

11. The beverage dispensing system of claim 1, wherein the customer account comprises a purchased beverage dispensing plan.

12. The beverage dispensing system of claim 11, wherein the mobile device application is configured to connect to a database comprising the purchased beverage dispensing plan.

13. The beverage dispensing system of claim 12, wherein the mobile device application allows the customer to select, on the customer mobile device, the purchased beverage dispensing plan for dispensing a purchased beverage.

14. The beverage dispensing system of claim 12, wherein the mobile device application comprises computer readable media that, when executed, is configured to collect the biometric characteristic of a customer.

15. The beverage dispensing system of claim 11, wherein the purchased beverage dispensing plan comprises:

an authorized amount of purchased beverage the customer is entitled to dispense from the beverage dispenser, and a beverage dispensing rule that dictates the authorized amount of purchased beverage the customer can dispense from the beverage dispenser.

16. The beverage dispensing system of claim 15, wherein the authorized amount of purchased beverage is at least one of: a volume of beverage, a number of beverage re-fills, or a cost of beverage, and wherein the beverage dispensing rule comprises at least one of: a beverage volume allowance rule, a beverage re-fill allowance rule, a time-based rule, a geographic location-based rule or a prepaid credit rule.

17. The beverage dispensing system of claim 15, wherein the controller is configured to track beverage dispensed by the customer and update the beverage dispensing rule based on beverage dispensed by the customer.

18. A beverage dispenser, comprising:

a wireless communication device configured to communicate with a customer mobile device via a wireless communication link and receive data comprising a biometric characteristic of a customer sent from the customer mobile device via the wireless communication link, wherein the biometric characteristic comprises biometric information collected by a biometric sensor of the customer mobile device;

a machine readable element at the beverage dispenser capable of identifying the beverage dispenser to the customer mobile device, wherein the machine readable element comprises a barcode, a magnetic strip, a quick response code, or a radio frequency identification tag; and a controller configured to:

wirelessly receive the data comprising the biometric characteristic from the customer mobile device via the wireless communication link, wirelessly receive the customer's selection of the beverage dispenser from the customer mobile device, associate the customer with a customer account based on the biometric information collected by the biometric sensor of the customer mobile device, and allow a beverage to be dispensed after associating the customer with the customer account.

19. The beverage dispenser of claim 18, wherein the controller is configured to track beverage dispensed by the customer and update the customer account based on beverage dispensed by the customer.

20. A method of dispensing a beverage from a beverage dispenser, the method comprising:

collecting a biometric characteristic of a customer with a biometric sensor comprised by a customer mobile device, wherein the customer mobile device is configured to send data collected by the biometric sensor and comprising the biometric characteristic via a wireless communication link;

scanning at the beverage dispenser, with the customer mobile device, a machine readable element comprised by the beverage dispenser to identify the beverage dispenser and allow the customer to select the beverage dispenser through the customer mobile device;

communicating data comprising the biometric characteristic collected by the biometric sensor of the customer mobile device to the beverage dispenser via a wireless communication link between the customer mobile device and the beverage dispenser, wherein the communicating comprises the customer mobile device sending the data comprising the biometric characteristic to the beverage dispenser via the wireless communication link, and wherein the beverage dispenser comprises a wireless communication device configured to communicate with the customer mobile device via the wireless communication link;

associating the customer with a customer account based on the biometric characteristic collected by the biometric sensor of the customer mobile device; and dispensing a beverage after associating the customer with the customer account.

* * * * *